US012171720B2

(12) United States Patent
Refua

(10) Patent No.: US 12,171,720 B2
(45) Date of Patent: Dec. 24, 2024

(54) MULTI-LUMEN SPIKE

(71) Applicant: SIRE Industries, LLC, Torrance, CA (US)

(72) Inventor: Sina M. Refua, Torrance, CA (US)

(73) Assignee: SIRE Industries, LLC, Torrance, CA (US)

( * ) Notice: Subject to any disclaimer, the term of this patent is extended or adjusted under 35 U.S.C. 154(b) by 889 days.

(21) Appl. No.: 17/162,531

(22) Filed: Jan. 29, 2021

(65) Prior Publication Data

US 2022/0241153 A1 Aug. 4, 2022

(51) Int. Cl.
*A61J 1/20* (2006.01)

(52) U.S. Cl.
CPC ........... *A61J 1/2096* (2013.01); *A61J 1/2048* (2015.05)

(58) Field of Classification Search
CPC ...... A61J 1/2096; A61J 1/2048; A61J 1/2058; A61J 1/1406; A61J 1/201; A61J 1/2006; A61M 5/1782; A61M 5/162; B01F 2101/2202
See application file for complete search history.

(56) References Cited

U.S. PATENT DOCUMENTS

| | | | | |
|---|---|---|---|---|
| 4,410,321 | A | 10/1983 | Pearson et al. | |
| 5,263,940 | A | 11/1993 | Kriesel | |
| 5,336,180 | A | 8/1994 | Kriesel et al. | |
| 6,723,068 | B2 | 4/2004 | Lavi et al. | |
| 7,882,863 | B2 | 2/2011 | Pestotnik et al. | |
| 8,529,502 | B2 | 9/2013 | Radmer | |
| 9,067,012 | B2 | 6/2015 | Chi et al. | |
| 9,662,621 | B2 | 5/2017 | Beyer et al. | |
| 9,925,333 | B2 | 3/2018 | Hooven et al. | |
| 11,497,684 | B2 * | 11/2022 | Merchant | A61J 1/2037 |
| 2002/0004643 | A1 | 1/2002 | Carmel et al. | |
| 2006/0106360 | A1 * | 5/2006 | Wong | A61M 5/162 604/411 |
| 2007/0244456 | A1 | 10/2007 | Fangrow | |
| 2008/0045919 | A1 | 2/2008 | Jakob et al. | |
| 2009/0159485 | A1 | 6/2009 | Jakob et al. | |
| 2010/0294796 | A1 | 11/2010 | Thilly | |
| 2016/0081308 | A1 * | 3/2016 | Cary | A61M 5/162 222/80 |

(Continued)

FOREIGN PATENT DOCUMENTS

| | | | |
|---|---|---|---|
| JP | S52-32998 | U | 3/1977 |
| WO | WO-2018/165588 | A1 | 9/2018 |

OTHER PUBLICATIONS

International Search Report and Written Opinion mailed Jun. 2, 2022, for International Application No. PCT/US22/13927, 12 pages.

(Continued)

*Primary Examiner* — James D Ponton
*Assistant Examiner* — Hong-Van N Trinh
(74) *Attorney, Agent, or Firm* — MASCHOFF BRENNAN; Benjamin Charkow

(57) ABSTRACT

A multi-lumen spike for mixing and reconstituting a medication in a dry state designed to provide the ability for a lay person to aseptically reconstitute a powdered medication for use with an infusion apparatus. The multi-lumen spike can be included as part of a medication mixing and loading apparatus capable of using one or more syringes for reconstituting the medication.

1 Claim, 12 Drawing Sheets

(56) References Cited

U.S. PATENT DOCUMENTS

| | | | | |
|---|---|---|---|---|
| 2017/0333286 | A1 | 11/2017 | Phipps | |
| 2018/0161243 | A1 | 6/2018 | Ariagno et al. | |
| 2022/0087902 | A1* | 3/2022 | Hsieh | A61J 1/2044 |

OTHER PUBLICATIONS

Supplemental Partial European Search Report and Provisional Opinion mailed Oct. 16, 2024, in European Patent Application No. 22746538.2, 16 pages.

* cited by examiner

MULTI-LUMEN SPIKE

FIELD OF THE INVENTION

The present invention relates generally to intravenous medication preparation and more particularly to an apparatus, for use by a lay person without any particular medical training, for the aseptic reconstitution of a sterile lyophilized powder for injection immediately prior to intravenous infusion through the use of an empty or prefilled elastomeric infusion pump or other medication delivery device.

BACKGROUND OF THE INVENTION

Better health outcomes are the lauded catch-all axiom and objective of most governments throughout the world; whether their healthcare is government-run or provided by privately held health care companies. The United States in particular spends 18% of its GDP on healthcare, more than twice the average among developed nations. Alarmingly, with more than 10,000 new Medicare beneficiaries enrolling into the program each day, with an estimated peak of over 80 million by the year 2035, better health outcomes must be achieved within evermore increasing budgetary limitations.

The home infusion pharmacy industry along with its integral counterpart, the skilled home health nursing agency industry, together help to achieve better health outcomes at a lower total cost versus hospital-based institutions, physician offices and clinics, as has been evident in the United States in the last several decades. Home infusion pharmacies in conjunction with skilled home health Registered Nurses ("RN's") permit medical patients to receive necessary medicines via intravenous infusion at a patient's home, rather than receiving the infusion at an infusion center, physician office, or at a hospital.

By permitting a patient to receive an intravenous medication at home, the patient saves significantly on costs associated with a visit to a hospital or infusion center. Further, there is a notable reduction in nosocomial and community-acquired infections especially as they relate to the highly contagious Clostridium Difficile bacterium, to the seasonal Influenza and other highly transmissible viruses, such as the SARS-Cov-2 which caused the 2019 novel coronavirus (COVID-19) disease.

To improve shelf life, most medications, especially antimicrobials administered via intravenous infusion either in a hospital or home setting, are manufactured as sterile lyophilized powders. This method of manufacture permits these medications to be stored at room temperature for long periods of time (i.e., up to several years).

However, intravenous medications in anhydrous powder form cannot directly be administered to a patient. Instead, these powders must be reconstituted and compounded into an aqueous solution so that the medications can be available for delivery to a patient, for example, via an intravenous infusion. The reconstitution is most typically carried out using a minimum of 10 mL of sterile water for injection ("SWFI") or 0.9% sodium chloride (i.e., normal saline) solution. This reconstitution is then transferred and further diluted with a diluent of 0.9% sodium chloride, 5% dextrose in water ("D5W") or other approved diluents for use in connection with an intravenous infusion delivery method such as a slow IV push, gravity infusion, elastomeric infusion pump, electronic pump and the like.

Each reconstituted medication, as required by the United States Pharmacopeia ("USP"), the worldwide standard setting body legally recognized in more than 140 countries, must be compounded in a sterile cleanroom environment under USP <797> standards and then must be stored at refrigerated temperatures to maintain stability of the compounded medication, now in aqueous solution. The stability of each medication varies based on both the specific medication and the anticipated method of administration. The maximum stability referred to by the USP as the Beyond-Use Date ("BUD") of any medication mixed in a USP <797> regulated clean room environment and stored at refrigerated temperatures of between 36° F. to 46° F., is currently 14 days. Some compounded medications are so unstable that their BUD is only a few hours. Revised USP <797> standards published on Jun. 1, 2019 and slated for enactment in 2021, will reduce the maximum BUD to 10 days.

In choosing the most appropriate method of administration of the reconstituted and diluted medication in its final compounded form, the patient's clinical status, socioeconomic factors and drug administration frequency, along with medication stability, must always be considered. In the United States, private health insurance plans pay home infusion pharmacy providers for the medication dispensed and a set "Per Diem" rate which is inclusive of administrative services, professional pharmacy services, care coordination, and all necessary supplies and equipment, irrespective of the administration methods, as noted above.

Therefore, cost must be considered in determining the most appropriate administration method for patients without health insurance paying completely paying out of pocket for both the medication and the Per Diem along with Medicare beneficiaries paying out of pocket for the Per Diem. This is because most home infusion medications, especially much needed antimicrobials, are not covered through traditional Medicare which covers only a very limited number of home infusion therapies along with skilled RN nursing services provided by home health agencies. Medicare through its Prescription Drug Program ("PDP") called Medicare Part D, pays solely for the vial of medication just like they would pay for a seniors' oral medications, with Medicare beneficiaries bearing the brunt and responsibility for the entire cost of the home infusion service (i.e., the Per Diem), out of their pockets.

Given their high mobility, ease of use and dependability, elastomeric infusion pumps have become a preferred method of administration for patient self-administered home intravenous infusion medications.

In order to maintain the sterility of a medication for use in connection with a patient self-administered intravenous home infusion medication, the powdered medication is first compounded at a home infusion pharmacy. As part of this process, the home infusion pharmacy reconstitutes the infusion medication and then aseptically compounds the medication into an elastomeric infusion pump so that the reconstituted medication is ready to be administered upon delivery to the patient's home.

Current commercially available elastomeric infusion pumps, such as B. Braun's Easypump, arrive to home infusion pharmacies sterile and empty. The home infusion pharmacy then prepares the elastomeric infusion pump for delivery to the patient. Once the desired medication is reconstituted, the elastomeric pump reservoir is first filled with the desired amount of diluent, typically 50-100 mL of 0.9% saline solution via a fill port on the proximal end of the elastomeric infusion pump which is affixed with a Luer lock valve which facilitates inflation of the elastomeric pump balloon.

The reconstituted medication, typically 10 mL, is then added to the elastomeric infusion reservoir via a Luer lock syringe to the fill port. Once this aseptic compounding process is completed, the medication must be stored under refrigeration at all times up until the next dose. The elastomeric infusion pump is labeled at the pharmacy with the specific patient/medication pertinent information and delivered to the patient's home under refrigerated temperatures on a consistent interval basis based on the final compounded stability which can range from as short as hours to up to 14 days. Typically, the pharmacy delivers the medication on a weekly basis, with the patient storing any additional doses of medication in a home refrigerator to maintain the stability of the medication, prior to use.

In the United States, due to the complexity and inherent risks of the compounding process, the sterile compounding process is supervised by a licensed pharmacist with oversight by, local, State (i.e. Boards of Pharmacy) and Federal (i.e. U.S. Food and Drug Administration FDA) agencies based on USP regulations.

Prior to starting the infusion, the patient typically removes the compounded elastomeric pump from the refrigerator about 15 minutes prior to the infusion to allow the medication to warm up to room temperature. This allows for a more comfortable and more efficient infusion. To initiate the infusion, the patient connects his or her vascular access device (i.e., peripherally inserted central catheter ("PICC line")) to the distal end of the elastomeric infusion pump, containing the IV tubing affixed with a Luer lock attachment. The contents of the elastomeric infusion reservoir are then delivered intravenously into the patient's bloodstream. Once the infusion is completed, a process which for most medications takes approximately 30 minutes, the patient disposes of the deflated and now empty elastomeric infusion pump as regular household trash.

Because the lyophilized medication (1) must be reconstituted and compounded in a sterile cleanroom environment under USP <797> regulations; and (2) has a refrigerated shelf-life of a maximum of a few hours up to fourteen days (soon to be decreased to ten days) once reconstituted, the home infusion pharmacy must make recurring deliveries per month to the patient to deliver the compounded medication, typically weekly or more often depending on the BUD.

The need to reconstitute and compound the lyophilized medication in a clean room, maintain the reconstituted medication under refrigeration, and make frequent typically weekly deliveries to the patient all add to the cost and resources used in with patient self-administered intravenous home medications infusion process.

Therefore, there exists a need for a streamlined all-encompassing apparatus to permit the sterile reconstitution and compounding of a powdered or aqueous injection medication into an elastomeric infusion pump by a lay person outside of a clean room environment and without any medical training immediately prior to intravenous infusion (thus obviating the need for refrigeration).

Though the need for this streamlined apparatus stems from the U.S. home infusion infrastructure, such an apparatus can be beneficial for use in disaster areas, war-torn areas or in developing nations. All of these areas frequently lack access to a sterile cleanroom environment under USP <797> mandated standards or as in the latter cases, may not have access to continuous electricity/refrigeration. Yet individuals in these areas may still require medication to be delivered via intravenous infusion and do not have the ability to receive such an infusion in a hospital or infusion center setting.

SUMMARY OF THE INVENTION

A multi-lumen spike designed alone and in connection with a mixing and loading apparatus to provide the ability for a lay person to aseptically reconstitute a powdered medication for use with an infusion apparatus is provided.

In one embodiment, the user connects the multi-lumen spike to a syringe containing diluent of either sterile water or 0.9% saline solution. In embodiments, base member of the multi-lumen spike has a male Luer lock connection at the first base member end (the end opposite the spike) which can engage the syringe, which is typically fabricated with a female Luer lock connection. The user then takes a medication vial containing dry medication, typically in powdered form. In embodiments the medication can be in any concentrated form or even a liquid that requires further dilution. As is typical, the medication vial contains a septum at the opening of the medication vial made of a material, often rubber, that can be pierced by a needle or other sharp object.

To commence the reconstitution process, the user pierces the septum with the multi-lumen spike. The spike is inserted through the septum until the base member of the multi-lumen spike abuts the top of the medication vial. In embodiments, a portion of the multi-lumen spike that abuts the base member has a spiral grappler comprising a protrusion that extends out from an outer surface of the multi-lumen spike and is wrapped in a spiral configuration partially up the multi-lumen spike. The grappler serves to prevent the medication bottle on the multi-lumen spike from slipping off the multi-lumen spike when pressure in the medication vial increases while the medication within the vial is being reconstituted.

The base member of the multi-lumen spike can include an outlet to which an elastomeric pump can be connected, preferably through the use of tubing between the base member outlet and the elastomeric pump. In embodiments, the outlet is located on the base member perimeter wall. In embodiments, the outlet is designed with a female inlet Luer lock fitting to conveniently connect to the outlet tubing for the elastomeric pump which typically has a male Luer lock connector. In embodiments, a back check valve can be situated between the base member outlet and the tubing connected to the elastomeric pump.

In embodiments, the elastomeric pump is commercially manufactured prefilled with 0.9% saline solution. In embodiments, the elastomeric pump is not prefilled and manufactured empty. Both of which of which are delivered to the infusion provider such as a home infusion pharmacy or hospital/infusion center and then ultimately to the patient/end user.

Once the elastomeric pump is connected, e.g., removably coupled and/or fluidicly coupled, to the outlet on the base member of the multi-lumen spike, through the interlocking of the Luer lock connection, or through other connection means such as Rekord connectors, the user depresses the plunger on the syringe by either pressing directly down on the syringe plunger and/or pulling down on a lever in engagement with the syringe to reduce strain on the user. This action pushes the liquid through the inlet lumen of the multi-lumen spike into the medication vial containing the dry medication.

In embodiments, the liquid for medication reconstitution (i.e., the diluent) is divided into multiple syringes, the outlets of which are combined prior to the liquid entering the inlet lumen of the multi-lumen spike. For example, where 50-100 mL of diluent is being used, three to five 20 mL or five 10 mL syringes can be used. This has at least two benefits. First, syringes prefilled with a diluent such as 0.9% saline solution are more widely available commercially in smaller sizes such as 10 mL and 20 mL syringes. Second, by dividing the 50-100 mL of diluent into up to five syringes, the pressure of the diluent entering the multi-lumen spike is increased multifold. As pressure is force divided by area, to create the same pressure of diluent entering the multi-lumen spike from a lager syringe requires more force on the plunger. From research performed by Hayward et al (https://pubmed.ncbi.nlm.nih.gov/21469942/) smaller syringes generate significantly more pressure than large syringe, thereby improving the efficiency and effectiveness of the reconstitution process whilst reducing the force required to be applied by the patient/end user.

In embodiments, the inlet lumen can include one or more branch lines within the multi-lumen spike, such that the liquid exits the multi-lumen spike through the one or more inlet lumen branch lines at one or more inlet openings. The liquid then mixes with the dry medication, thoroughly mixing the contents. The now completely reconstituted contents of the vial exit the multi-lumen spike through one or more outlet openings, which direct the liquid into one or more outlet lumen branch lines, which combine within the multi-lumen spike to the outlet lumen. In embodiments, the multi-lumen spike can include between one and eight outlet lumen branch lines. In a preferred embodiment there are four outlet lumen branch lines. The reconstituted medication passes through the outlet lumen, through the base member outlet port and either directly or indirectly into the elastomeric pump.

The multi-lumen spike may include a tubular member abutting and/or coupled to a base member with the tubular member narrowing to a point at the end opposite the base member and forming a piercing member capable of piercing the septum of the medication vial. In embodiments, the piercing member is shaped as a polygonal-sided pyramid. In embodiments, piercing member is shaped as a cone. The piercing member can have several other shape configurations.

In an embodiment, an inlet lumen and an outlet lumen extend through the multi-lumen spike from the base member to the piercing member to openings in the exterior surface or surfaces of the piercing member, depending on whether the piercing member is a shaped as a cone (which has only one surface) or a polygonal-sided pyramid, which has multiple surfaces. When the syringe is depressed, diluent from the syringe enters the inlet lumen at the base member of the multi-lumen spike and travels through the inlet lumen, exiting at the inlet opening on the piercing member (e.g., the first side of the polygonal pyramid or on the exterior surface of the cone). The diluent mixes with the powdered medication and then returns into the multi-lumen spike through a second opening (an outlet opening) on the piercing member. In embodiments where the piercing member is a polygonal-sided pyramid, the second opening is located on a second side of the polygonal pyramid. In embodiments where the piercing member is a cone, the second opening is located on the surface of the cone, preferably opposite (e.g., 180 degrees offset of) the first opening. The diluent passes through the second opening and into the outlet lumen. The reconstituted medication then flows into the elastomeric pump, passing through a back check valve in some embodiments.

In embodiments, the inlet and outlet lumens can be either integrally constructed as part of the multi-lumen spike, or as separate tubular members within a hollow housing comprising the multi-lumen spike.

In another embodiment, the polygonal-sided pyramid of the piercing member can include four sides, with two sides of the polygonal-sided pyramid containing openings for the outlet lumens and two sides of the polygonal-sided pyramid containing openings for the inlet lumens. In embodiments where the piercing member is cone-shaped, the cone can include four openings on the exterior face of the cone. Under either construction, the inlet lumen can include a branch line such that the inlet lumen splits into two branches between a first end of the base member (e.g., the end not abutting and/or coupled to the tubular housing) and the piercing member, forming two separate fluid channels (e.g., one to each respective inlet opening). Similarly, the outlet lumen can include a branch line such that the outlet lumen splits into two branches between the first end of the base member and the piercing member forming two separate fluid channels (e.g., one to each of the respective outlet openings). Under such a configuration, when the syringe is depressed, diluent from the syringe enters the inlet lumen at the base member of the multi-lumen spike and flows through the inlet lumen branch lines, exiting through inlet openings on two sides of the polygonal pyramid or the cone at the piercing member, depending on the form of construction of the piercing member. In embodiments with a polygonal-pyramid shaped piercing member, the inlet openings are located on opposing (e.g., first and third) sides of the polygonal pyramid. In embodiments, the inlet openings are located on adjacent (e.g., first and second) sides of the polygonal pyramid.

The diluent mixes with the powdered medication and then returns into the outlet openings and into the outlet lumen branch lines, entering the spike through openings on two sides of the polygonal pyramid or the cone at the piercing member, depending on the form of construction of the piercing member. In embodiments with a polygonal-pyramid shaped piercing member, the outlet openings are located on opposing (e.g., second and fourth) sides of the polygonal pyramid. In embodiments, the outlet openings are located on adjacent (e.g., third and fourth) sides of the polygonal pyramid.

In embodiments, the inlet lumen, or in embodiments with branch lines, the inlet lumen branch lines, the inlet opening (s) are on the exterior surface of the piercing member when the piercing member is shaped as a cone, or on the exterior surfaces of the piercing member when the piercing member is shaped as a polygonal-sided pyramid. In this embodiment, the one or more outlet openings can be located on the face of the tubular member at a location between the piercing member and the base member. In embodiments, the outlet lumen can include one or more branch lines connecting to the outlet openings. In embodiments, there can be between one and eight branch lines leading to between one and eight outlet openings. In a preferred embodiment, there are four outlet lumen branch lines leading to four outlet openings.

To ensure that as much of the reconstituted medication as possible is sent through the outlet lumen and into the elastomeric pump (and that it has a labeled potency of plus or minus ten percent as required by USP, State and Federal law), in embodiments where one or more outlet openings are on the face(s) of the piercing member, there can be one or more additional branches of the outlet lumen terminating in outlet openings on the tubular housing of the multi-lumen spike, located between the midpoint of the tubular housing and the base member. In one embodiment, the tubular housing is configured with two such openings. Additional outlet openings are particularly advantageous when the medication is being mixed with the multi-lumen spike oriented in the upward (i.e., South to North) orientation. In such an orientation, gravity pulls the powdered medication and any reconstituted liquid within the medication vial, towards the top of the vial (which in this orientation is oriented downward), which could leave the piercing member exposed to the air and unable to receive the remaining reconstituted medication within the vial.

The reconstituted medication then travels into the elastomeric pump, passing through a back check valve in some embodiments.

In embodiments where the elastomeric pump is commercially manufactured and supplied to the home infusion pharmacy as prefilled with 0.9% saline solution, the syringe needs to contain at a minimum the amount of liquid necessary to reconstitute the dry medication, typically about 10-20 mL. In embodiments where an empty elastomeric pump is connected to the multi-lumen base member, the syringe preferably contains sufficient diluent, typically about 50-110 mL, but more typically about 100 mL, to not only reconstitute the powdered medication, but to also further dilute and fill the elastomeric pump.

In embodiments, the multi-lumen spike is one component in a mixing and loading apparatus designed to improve the ease of a lay person in aseptically reconstituting a powdered medication under sterile conditions.

In an embodiment, the multi-lumen spike is one component of a mixing and loading apparatus for use with an elastomeric pump. In such an embodiment, the mixing and loading apparatus can include a housing unit with a compressible push-button ceiling in which the apparatus arrives to the patient from the home infusion pharmacy with the sterile lyophilized powder for injection attached and loaded ready for reconstitution, compounding and administration. In other embodiments the apparatus can include a retractable floor in which the lyophilized powder for injection is attached but requires connection prior to reconstitution and compounding.

Within the housing of the apparatus are stored one or more prefilled syringes. In embodiments with one prefilled syringe, the prefilled syringe has a multi-lumen spike at the outlet, preferably connected with a Luer-lock connection. In embodiments, up to five 20 mL syringes are stored within the housing of the apparatus. In such a configuration, the syringes can be connected to a structure, preferably disc-shaped, with Luer Lock connections. The structure can include tubing which combines the outlet from each syringe into the one outlet line which is connected with a multi-lumen spike, preferably with a Luer-lock connection. In such embodiments, the mixing and loading apparatus can also include either an empty or prefilled elastomeric pump and a compartment for the anhydrous powdered medication. In each embodiment, a window is provided into the medication compartment to view the state of the medication (i.e., has it been reconstituted or is it still in powdered form).

In an embodiment, the multi-lumen spike is aligned within the same vertical orientation as the syringe and is attached to the prefilled syringe allowing for attachment and loading of a sterile lyophilized powder for injection or sterile aqueous solution for injection vial. In another embodiment, the multi-lumen spike is attached onto the retractable floor, with the inlet lumen connected to the prefilled syringe, and the outlet lumen connectable to an infusion device, such as an empty or prefilled elastomeric pump. First, the patient removes a safety mechanism, such as an interlocked pin between the push button ceiling from below the syringe finger flange, to activate the apparatus. Then, when the patient pushes down on the compressible push-button ceiling, the ceiling engages with the prefilled syringe, and in one embodiment where the medication vial is attached but not loaded to the multi-lumen spike, simultaneously, pushes the multi-lumen spike through the septum of the powdered medication vial. In the other embodiment, the sterile anhydrous or aqueous medication is attached and loaded to the multi-lumen spike. The contents of the prefilled syringe then enter the medication vial and due to the unique configuration of the multi-lumen spike, fully mixes the contents of the vial. The reconstituted medication then exits the medication vial through the second lumen and is further diluted by transference into an infusion pump and thereby ready for immediate infusion.

Once the reconstituted medication has been transferred into the infusion pump, in one embodiment, the mixing and loading apparatus can be disconnected from the infusion pump and the patient can prepare for the medication infusion using conventional means such an elastomeric infusion pump.

In embodiments, the housing for the mixing and loading apparatus can include a safety mechanism interlocked pin between the push-button ceiling from below the syringe finger flange and retractable bottom which prevents the push-button ceiling from being depressed and the floor from retracting before the patient is ready to commence the infusion.

In an alternative embodiment, a prefilled elastomeric pump is contained within the housing. In such an embodiment, the patient connects an outlet tube from the mixing and loading apparatus directly into the patient's vascular access device.

In the preferred embodiment for patient self-administered home intravenous infusion medications, the design and configuration is to accommodate for more ease of use. The sterile lyophilized powder for injection or sterile aqueous solution for injection vial can be both attached and loaded by the home infusion pharmacy to the prefilled syringe via the multi-lumen spike which is positioned within the same vertical orientation. The elastomeric pump is empty and after the patient pushes down on the compressible push-button ceiling, the contents of the prefilled syringe reconstitute the anhydrous vial and then mix into the empty elastomeric pump, facilitating inflation of the elastomeric pump balloon.

The elastomeric pump is then ready for immediate infusion. In this embodiment, the stability of the apparatus is at least 30 days at room temperature.

In an embodiment designed specifically for longer term stability for use in disaster situations and areas without continuous electricity/refrigeration, the design and configuration are altered such that the medication vial containing the sterile lyophilized powder for injection or sterile aqueous solution for injection can be attached but not loaded to the multi-lumen spike (i.e., the multi-lumen spike does not yet pierce the septum of the medication vial). This allows for greater stability, namely the expiration of the either sterile anhydrous aqueous medication vial, the prefilled syringe or prefilled elastomeric pump whichever comes first; all of which have been manufactured to FDA standards to maintain multiyear stabilities.

In an embodiment designed specifically for emergency and military personnel, the design and configuration can be altered to allow for greater infusion volumes up to 1,000 mL in each pump along with ability for variable controlled infusion rates whereby the apparatus contains an infusion rate flow regulator affixed at its outlet. In this alternative embodiment, the sterile lyophilized powder for injection or sterile aqueous solution for injection vial is attached and but not yet loaded to the multi-lumen spike. While this embodiment also allows for greater stability, namely either the expiration of the anhydrous medication or the prefilled syringe or prefilled elastomeric pump, whichever comes first, it also allows for military and/or medical personnel to adjust the infusion flow rate based on patient conditions on the ground, whether battlefield or makeshift emergency center.

In another embodiment, to reduce the size and scale of the apparatus, the reconstituting and diluting fluid can be contained within a chamber attached to the multi-lumen spike and activated by a plunger.

It is anticipated and within the scope of this invention that the end user; whether a lay person receiving his or her prescribed self-administered home intravenous infusion medication, or in a disaster area led by a healthcare or military medical personnel, each will have the ability to aseptically, efficiently and safely reconstitute and compound intravenous medications immediately prior to infusion via an elastomeric infusion pump or other infusion apparatus; all without access to sterile cleanroom environments, continuous electricity/refrigeration, with multiyear stability and the ability to modulate the flow rate as clinically required. Thereby bettering healthcare outcomes by decreasing the inherent cost and personnel safety concerns of aseptically mixing infusion medications in a sterile cleanroom environment whilst increasing potency and efficacy. Additionally, and as equally important, further conveying the ability to uninjuriously deliver life persevering intravenous medications in disaster and war-torn areas without access to sterile cleanroom environments, refrigeration, required supplies (i.e. IV poles, infusion pumps) and provide streamlined mixing and administration device.

In one embodiment, the mixing and loading apparatus would permit the powdered or aqueous injection medication to be both simultaneously attached and loaded thereby allowing for at least 30 days of medication to be shipped to the patient for patient self-administered home intravenous infusion, all which are to be stored at room temperature ranges rather than refrigerated. In another embodiment, the components of the apparatus convey a multi-year stability as they will be attached but not yet loaded to the apparatus, ideal for areas affected by disasters, natural or otherwise (man-made), without access to a sterile compounding environment or continuous electricity/refrigeration.

In embodiments, the multi-lumen spike comprises a tubular housing with a first tubular housing end comprising a conical piercing member including an exterior face comprising a first opening, a second tubular housing end, and a tubular housing perimeter wall comprising a second opening. The multi-lumen spike may also include a base member that includes a first base member end, a second base member end coupled to the second tubular housing end, and a base member perimeter wall. The base member can include a fluid entry port and a fluid exit port. The multi-lumen spike may also include an inlet lumen extending from the fluid entry port to the first opening and configured to carry fluid into the tubular housing. The multi-lumen spike may also include an outlet lumen extending from the second opening to the fluid exit port and configured to carry fluid out of the tubular housing.

In embodiments, the face of the conical piercing member can include a third opening and the tubular housing can include a fourth opening, fifth opening, and sixth opening. The inlet lumen extends within the tubular housing and can include a first inlet lumen branch line and a second inlet lumen branch line which branch from the inlet lumen at an inlet lumen branch point located between the first base member end and the piercing member such that the first inlet lumen branch line extends from the inlet lumen branch point to the first opening and the second inlet lumen branch line extends from the inlet lumen branch point to the third opening. The outlet lumen extends within the tubular housing and can include a first outlet lumen branch line and a second outlet lumen branch line which branch from the outlet lumen at an outlet lumen branch point located between the first base member end and the piercing member. One or more outlet lumen connector lines connect the first outlet lumen branch line and the second outlet lumen branch line to the second opening, fourth opening, fifth opening and sixth opening.

In embodiments, a multi-lumen spike for mixing and reconstituting a medication in a dry state comprises a tubular housing. The tubular housing can include a first tubular housing end comprising a first polygonal pyramid-shaped piercing member comprising a first pyramidal side comprising a first opening, a second pyramidal side comprising a second opening, and a third pyramidal side; a second tubular housing end; and a tubular housing perimeter wall. The multi-lumen spike may also include a base member comprising a first base member end, a second base member end attached to the second tubular housing end and a base member perimeter wall. The base member can include a fluid entry port and a fluid exit port. The multi-lumen spike can also include an inlet lumen extending from the fluid entry port to the first opening and configured to carry fluid into the tubular housing. The multi-lumen spike can also include an outlet lumen extending from the second opening to the fluid exit port and configured to carry fluid out of the tubular housing.

In embodiments, the polygonal pyramid-shaped piercing member can include at least four sides including a fourth pyramidal side with the third pyramidal side having a third opening and the fourth pyramidal side having a fourth opening. The inlet lumen extends within the tubular housing and includes a first inlet lumen branch line which branches from the inlet lumen at an inlet lumen branch point located between the first base member end and the piercing member, such that the inlet lumen branch line extends from the inlet lumen branch point to the third opening. The outlet lumen extends within the tubular housing and includes a first outlet lumen branch line which branches from the outlet lumen at a first outlet lumen branch point located between the first base member end and the piercing member such that the first outlet lumen branch line extends from the first outlet lumen branch point to the fourth opening.

In embodiments, the tubular housing perimeter wall comprises a first tubular housing opening between the midpoint of the length of the tubular housing and the base member. The outlet lumen can include a second outlet lumen branch line which branches from the outlet lumen at the second outlet lumen branch point located between the first base member end and the piercing member, such that the second outlet lumen branch line extends from the second outlet lumen branch point to the first tubular housing opening.

In embodiments, a medication mixing and loading apparatus comprises a hollow housing that includes a perimeter wall with an open upper end and an open lower end, a hollow push button member comprising a closed upper end and an open lower end slidably mounted at the open upper end of the housing and capable of traveling between a push button open position and a push button closed position. The closed upper end of the hollow push button member can include an outer push button surface and an inner push button surface, wherein in the push button open position the push button member is extended out of the open upper end of the hollow housing and in the push button closed position, the push button member is located with at least a portion of the push button member within the hollow housing such that the outer push button surface of the push button is closer to or about level with the open upper end of the hollow housing. A hollow retractable floor member comprises a closed lower end and an open upper end slidably mounted at the open lower end of the housing and capable of travelling between a retractable floor open position and a retractable floor closed position. The closed lower end of the hollow retractable floor can include an outer retractable floor surface and an inner retractable floor surface wherein in the retractable floor open position, the retractable floor member is extended out of the open lower end of the hollow housing and in the retractable floor closed position. The retractable floor member can be located with at least a portion of the retractable floor member in the hollow housing such that the outer retractable floor surface of the retractable floor is at a position closer to or about level with the open lower end of the hollow housing.

A syringe can be located within the housing, the syringe comprising at least a plunger and barrel and the syringe capable of holding a fluid within. A multi-lumen spike is located on the inner surface of the retractable floor, the multi-lumen spike comprising an inlet lumen connected to the syringe via a first conduit, and an outlet lumen connected to a second conduit capable of carrying fluid outside of the housing. An opening in the perimeter wall of the housing is sized for holding a vial of medication with a stopper to keep the medication within the vial, the opening located such that when the retractable floor is in the retractable floor closed position, the multi-lumen spike is capable of puncturing the stopper of the vial when the vial of medication is housed in the opening and the vial stopper is oriented towards the multi-lumen spike. When the syringe is in an open position and the push button member is in the push button open position, the plunger of the syringe extends above the open upper end of the housing and into a volume defined by the push button member. The plunger is capable of being pushed into the barrel of the syringe by the inner surface of the push button member when the push button member travels from the push button open position to the push button closed position and, when the retractable floor is in the retractable floor closed position, the plunger is capable of expelling any fluid in the barrel of the syringe out of the syringe, through the inlet lumen of the multi-lumen spike, into the medication vial and through the outlet lumen of the multi-lumen spike.

In embodiments, there is provided a method for reconstituting a medication in powder form comprising pushing down on a mixing and loading apparatus with sufficient force to retract a retractable floor in the mixing loading apparatus, puncturing a stopper on a vial containing powdered medication with a multi-lumen spike in contact with the retractable floor and comprising an inlet lumen and an outlet lumen, pressing down on a push button, the push button pushing down on a fluid-containing syringe with a plunger initially in an open position when the push button comes in contact with the plunger of the fluid-containing syringe and expelling fluid from the syringe and into the inlet lumen such that the fluid mixes with the powdered medication within the vial to form a reconstituted solution, the reconstituted solution then exiting the vial through the outlet lumen.

These and other features of this invention are described in, or are apparent from, the following detailed description of various exemplary embodiments of this invention.

BRIEF DESCRIPTION OF THE DRAWINGS

Exemplary embodiments of this invention will be described with reference to the accompanying figures wherein.

DETAILED DESCRIPTION OF THE EXEMPLARY EMBODIMENTS

Figure 1B:
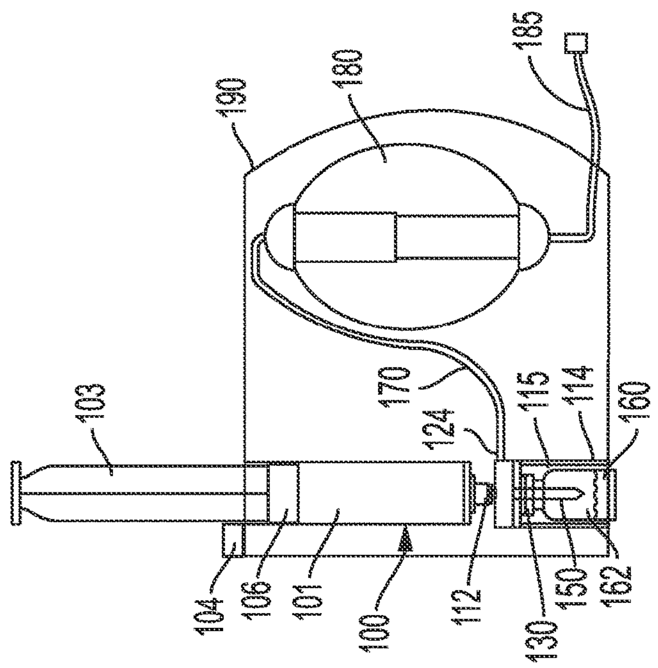
FIG. 1B is a schematic view of the embodiment of FIG. 1A of the medication mixing and loading apparatus equipped with the multi-lumen spike of the present invention shown in a loaded state.
Figure 1C:
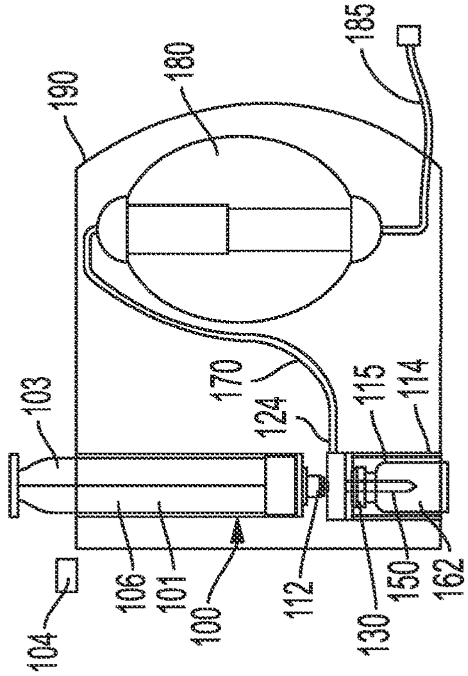
FIG. 1C is a schematic view of the embodiment of FIG. 1A of the mixing and loading apparatus embodying the present invention in the fully unloaded position shown after the patient has fully engaged the syringe, injecting diluent through the medication vial and into the elastomeric pump.
Figure 1A:
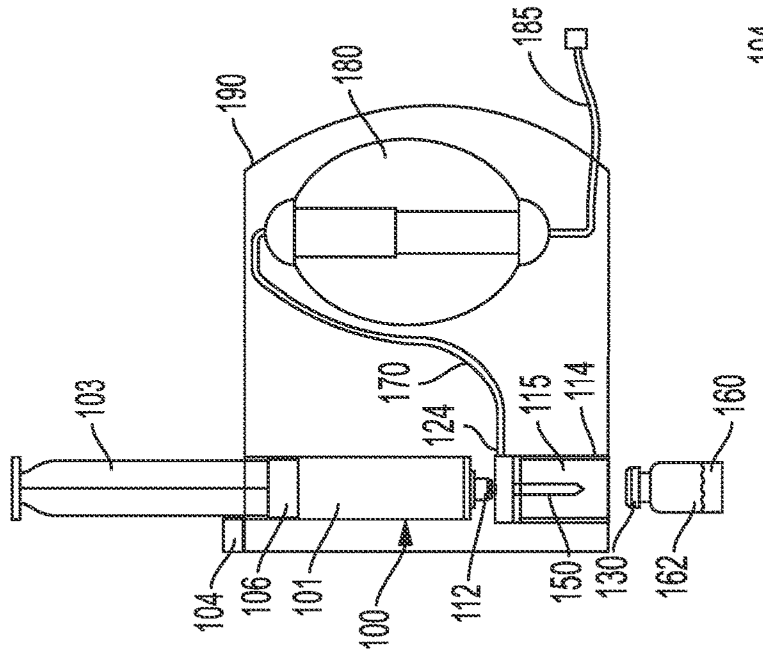
FIG. 1A is a schematic view of an embodiment of a medication mixing and loading apparatus equipped with the multi-lumen spike of the present invention shown in a pre-loaded state without a medication vial loaded into the apparatus.

Initially referring to FIG. 1A, an embodiment of the medication mixing and loading apparatus equipped with the multi-lumen spike of the present invention is shown. The components of the medication mixing and loading apparatus may comprise a syringe 100, multi-lumen spike 150, tubing 170, elastomeric pump 180, IV tubing 185 and product casing 190.

The mixing and loading apparatus has three primary states: (1) a pre-loaded state, when the mixing and loading apparatus is ready to reconstitute the medication but the medication vial has yet to be loaded into the apparatus; (2) a loaded state, when the mixing and loading apparatus is ready to reconstitute the medication; and (3) an unloaded state, when the mixing and loading apparatus has been used to reconstitute a medication. FIG. 1A illustrates the mixing and loading apparatus in the pre-loaded state.

In one embodiment, elastomeric pump 180 is prefilled with a sterile 0.9% saline solution (typically 50 mL to 100 mL) and the syringe body 101 is filled with sufficient liquid (typically 10 ml) to reconstitute the powdered medication 160 contained within medication vial 162. In another embodiment, elastomeric pump 180 is empty, and the syringe body 101 is filled with sufficient liquid (typically about 50 mL to 100 mL) to both reconstitute the powdered medication 160 contained within medication vial 162, and to fill the elastomeric pump 180 with the reconstituted medication such that it is available for infusion to the patient.

The size of product casing 190 can vary depending on the size of syringe 100. For example, if the elastomeric pump is being filled using syringe 100, a larger syringe will be necessary, resulting in a larger product casing needed than if syringe 100 is filled only with sufficient diluent to reconstitute the powdered medication 160 and send the reconstituted medication to the elastomeric pump 180. In embodiments, instead of one syringe 100, multiple syringes are arranged in series. For example, instead of one syringe with 100 mL of liquid for reconstitution, five syringes of 20 mL each are connected in series. In embodiments, instead of one syringe 100, multiple syringes are arranged in parallel. For example, instead of one syringe with 100 mL of liquid for reconstitution, five syringes of 20 mL each are connected in parallel. Under either of these configurations, the multi-lumen spike would be connected to tubing that collects the liquid from each syringe for use in reconstitution of the powdered medication.

Figure 2A:
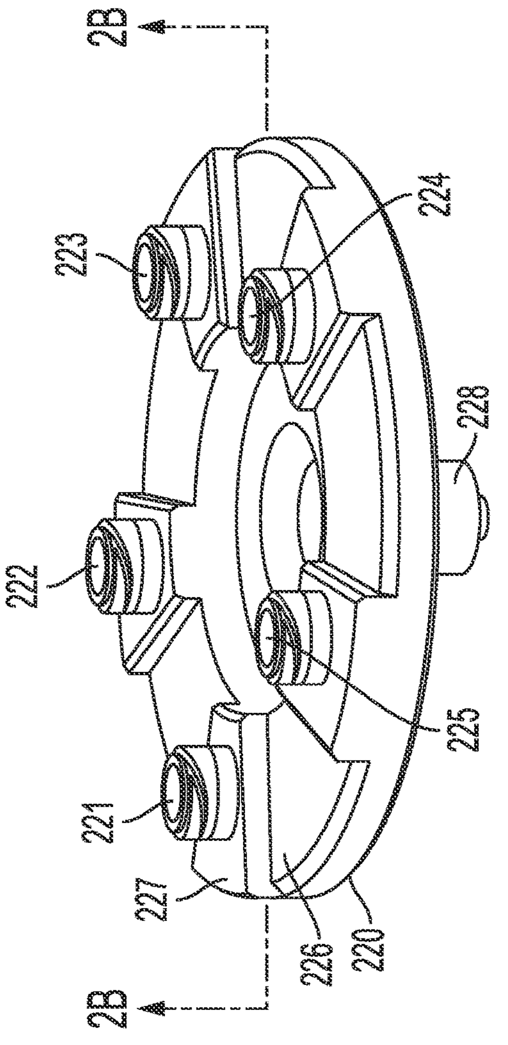
FIG. 2A is a perspective schematic view of a manifold apparatus used in connection with embodiments with multiple syringes, shown here with the ability to accommodate five syringes.
Figure 2B:
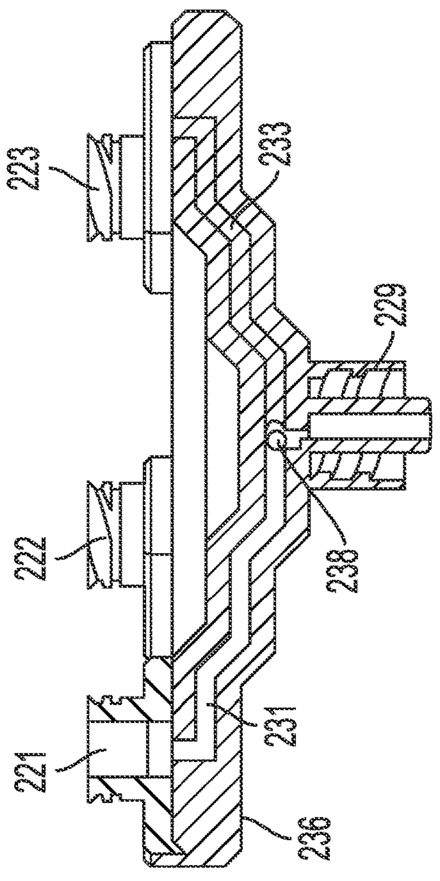
FIG. 2B is a cross-sectional view of the manifold apparatus of FIG. 3A along the line 3B-3B of FIG. 3A.

A manifold apparatus, such as shown in FIGS. 2A and 2B, can be used for such a multi-syringe configuration. Turning to FIG. 2A, a disc-shaped manifold apparatus 220 is shown for use in combination with five syringes. In embodiments, manifold apparatus 220 is disc-shaped with five manifold inlet ports 221, 222, 223, 224, 225. Each manifold inlet port is equipped with female Luer lock connections mounted on a first surface 226 to engage the syringes (not shown). In embodiments, each manifold inlet port is located on a raised platform, such as 227, on the first surface 226. Each manifold inlet port is configured to receive diluent from the respective syringe. The manifold apparatus is configured with tubing 231, 233 connected to each respective manifold inlet port. The tubing for each manifold inlet port joins the respective manifold inlet port to and exits the manifold apparatus at manifold outlet port 229.

Turning to FIG. 2B, details of this configuration can be seen. FIG. 2B illustrates tubing 231 connected to manifold inlet port 221, and tubing 233 connected to manifold inlet port 223. The tubing from each manifold inlet port connects at manifold junction 238. Tubing then connects manifold junction 238 to manifold outlet port 229, which is mounted on a second surface 236 to engage the multi-lumen spike (not shown). While the example embodiment of FIG. 2B only shows tubing from two of the manifold inlet ports 221, 223, it is to be understood that tubing can extend from each respective manifold port 221-225 in a manner substantially similar to that shown in the example of FIG. 2B. One of ordinary skill in the art would recognize that the tubing from the manifold inlet ports to the manifold outlet port can be connected in multiple ways, with the tubing from the manifold inlet ports combining at varying locations and not necessarily at manifold junction 238.

Figure 3B:
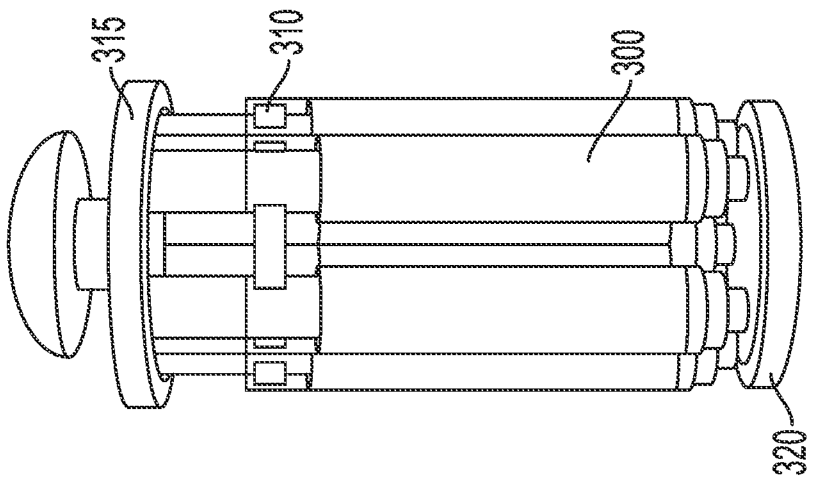
FIG. 3B is a schematic view of the manifold apparatus in use with five syringes after the syringes have been fully engaged.
Figure 3A:
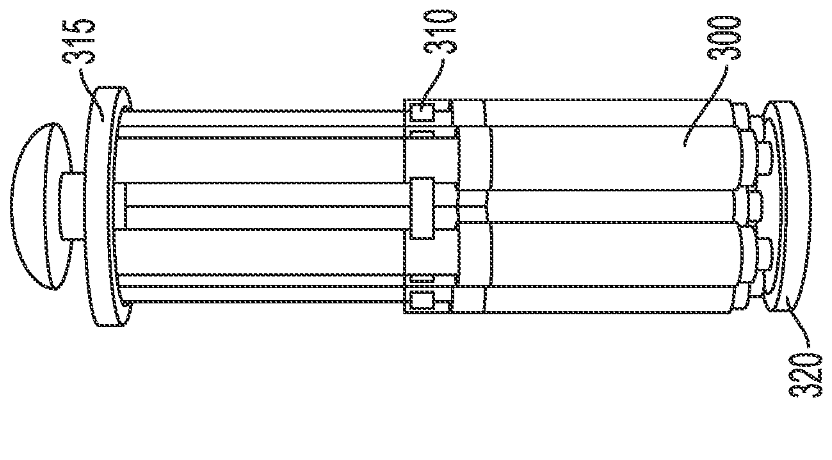
FIG. 3A is a schematic view of the manifold apparatus in use with five syringes in an open position.

FIGS. 3A and 3B illustrate an embodiment of the manifold apparatus when used in combination with multiple syringes. Turning to FIG. 3A, syringes 300, each equipped with a male Luer lock connection, are connected to the respective female Luer lock connection of the manifold inlet port. Retaining member 310 is designed to keep each of syringes 300 from moving when the syringes are actuated. Manifold plunger 315 is configured to engage with the plunger of each syringe 300 so that each syringe's plunger can be simultaneously engaged to send diluent though the manifold apparatus 320 and into the multi-lumen spike (not shown). FIG. 3A illustrates syringes 300 in the open position. Turning to 3B, syringes 300 are shown after manifold plunger 315 has been pressed, engaging each syringe such that each syringe is in a fully unloaded state.

Turning back to FIG. 1A, in a typical operation of the medication mixing and loading apparatus, a pharmacist at the home infusion pharmacy prepares the medication mixing and loading apparatus for home infusion use by the patient/end user. The pharmacist typically receives the syringe 100 and elastomeric pump 180 prefilled with 0.9% saline solution from a commercial manufacturer, such as B. Braun Medical Inc. and the like. In situations where it is not possible to receive prefilled syringes, the pharmacist could load the syringe under sterile conditions. In the event the pharmacist either loads the syringe or fills the elastomeric pump under sterile conditions, the USP <797> and federally regulated shelf life of the medication mixing and loading apparatus is reduced to 14 days (and soon to be reduced to ten days).

Multi-lumen spike 150 is shown in FIG. 1A with a male Luer lock connection 112 to engage and be removably coupled to syringe 100, which is typically fabricated with a female Luer lock connection, as shown here. Multi-lumen spike 150 has a female Luer lock connection 124 to engage and be removably coupled to tubing 170, which typically terminates with a male Luer lock connection.

Figure 8:
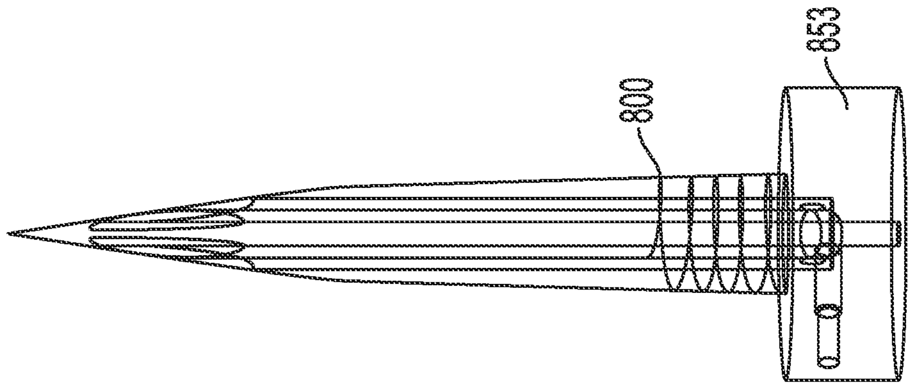
FIG. 8 is a schematic view of the multi-lumen spike embodying the present invention with a grappler mechanism.

In embodiments, medication vial 162 is preloaded into the medication and mixing apparatus by the home infusion pharmacist. In such an embodiment, guide and securing mechanism 114 is used to help align medication vial 162 into the medication and mixing apparatus while it is loaded into loading chamber 115. In embodiments, the multi-lumen spike 150 extends into at least a portion of the loading chamber 115. Medication vial 162 is loaded into loading chamber 115, forcing multi-lumen spike 150 to pierce the rubber septum of sealed top 130 of medication vial 162. In embodiments (not shown in this FIG.), a portion of the multi-lumen spike proximal to the cylindrically-shaped base member has a spiral grappler comprising a protrusion that extends out from an outer surface of the multi-lumen spike and is wrapped in a spiral configuration partially up and along the longitudinal axis of the multi-lumen spike. Such a grappler 800 is shown in FIG. 8 proximal to cylindrically-shaped base member 853. The grappler serves to prevent the medication bottle on the multi-lumen spike from slipping off the multi-lumen spike during reconstitution of the medication, when pressure in the medication vial increases while the medication within the vial is being reconstituted.

Turning to FIG. 1B, the medication mixing and loading apparatus is shown after the medication vial 162 is loaded into loading chamber 115.

Once multi-lumen spike 150 pierces the septum of sealed top 130, under current USP standards, the home infusion patient would have up to 30 days from the time of loading of the medication vial 162 to reconstitute the powdered medication 160 and self-administer the home intravenous infusion, all while stored at room temperature. In another embodiment, medication vial 162 would be delivered to the patient before it is loaded in the medication mixing and loading apparatus. In such an embodiment, the components of the apparatus convey a multi-year stability as manufactured to FDA standards, ideal for areas affected by disasters, natural or otherwise (manmade), without access to a sterile compounding environment or continuous electricity/refrigeration.

Referring now to FIG. 1B, to prevent accidental or inadvertent reconstitution of the powdered medication 160, or discharge of the contents of syringe 100 prior to loading of the medication vial 162, safety mechanism 104, locks plunger 103 in the fully extended position, as shown in FIGS. 1A and 1B. Safety mechanism 104 is shown in FIGS. 1A and 1B as a pull tab, but can be any other type of syringe locking safety mechanisms (e.g., pull-pin or clamp) known to one of ordinary skill in the art.

In typical operation, when the home infusion patient (or other infusion provider) is ready to prepare the infusion, the patient removes the safety mechanism 104, and fully depresses plunger 103, causing the diluent to travel through the syringe, through the multi-lumen spike of the present invention, through tubing 170, and into elastomeric pump 180. In embodiments, a lever (not shown) is used instead of or in combination with the plunger to facilitate use of the syringe. In embodiments, a check valve (not shown) prevents backflow of the reconstituted medication back into syringe 100. In embodiments, a check valve (not shown) prevents backflow of the reconstituted medication into medication vial 162.

Turning to FIG. 1C, the mixing and loading apparatus embodying the present invention is illustrated in the fully unloaded position after the patient has fully engaged the syringe, injecting diluent through the medication vial and into the elastomeric pump. As seen, safety mechanism 104 has now been removed from the apparatus, and syringe plunger 103 is fully depressed into syringe body 101. Powdered medication 162 has now been fully reconstituted and the fully-mixed contents have flowed through tubing 170 into elastomeric pump 180. It is anticipated that throughout the entire system, there will remain approximately up to 10 mL of diluent within the tubing of the mixing and loading apparatus. This amount of diluent has been accounted for in order to ensure the patient receives the proper amount of medication at the appropriate concentration.

Now that the elastomeric pump is fully loaded with the reconstituted medication, IV tubing 185, which has a first end coupled to elastomeric pump 180 and a distal second end that exits pump casing 190 can now be directly connected to the patient in a manner known to one of ordinary skill in the art. Alternatively, elastomeric pump 180 can be removed from the pump casing 190 and the elastomeric pump can be connected to the IV tubing in any manner known and customary to one of ordinary skill in the art.

Figure 4B:
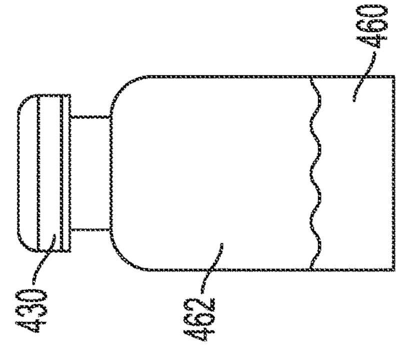
FIG. 4B is a schematic view of the medication vial for use in connection with the multi-lumen spike embodying the present invention.
Figure 4A:
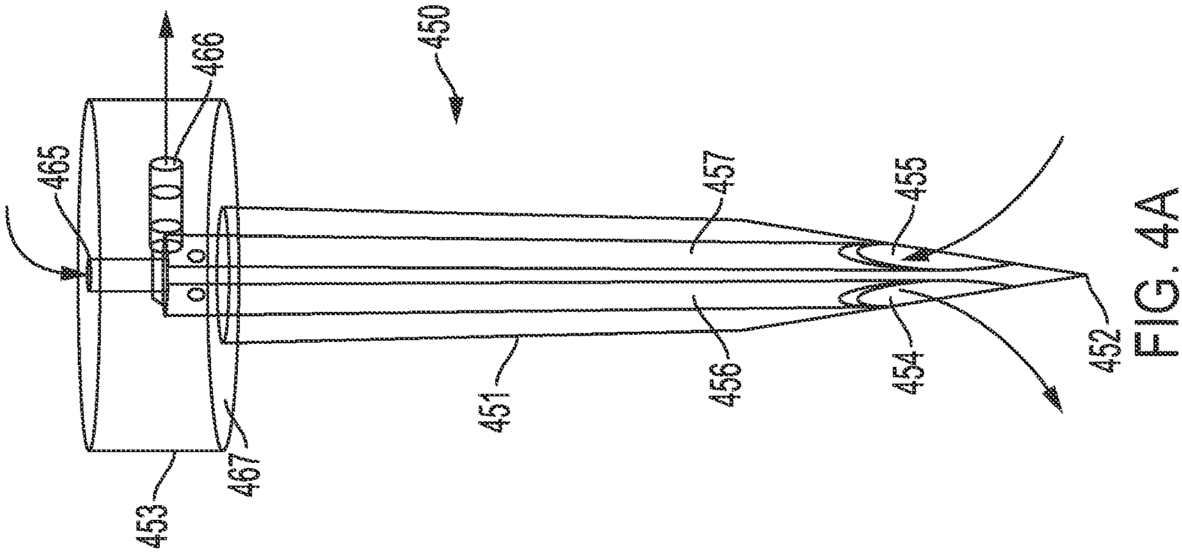
FIG. 4A is a schematic view of one embodiment of the multi-lumen spike embodying the present invention.

Turning to FIGS. 4A and 4B, the components of an embodiment of a multi-lumen spike in accordance with the present invention are shown and described in detail. Multi-lumen spike 450 comprises tubular housing 451 with a first tubular housing end, namely piercing member 452, and a second tubular housing end which abuts and is attached to cylindrically-shaped based member 453. The tubular housing 451 may include a hollow or substantially hollow interior extending from the first tubular housing end to the second tubular housing end. Though housing 451 is described as being tubular, one of ordinary skill in the art would recognize that the entire multi-lumen spike can be fabricated as one complete piece, and thus the various lumens and branch lines described herein all are components of the singular multi-lumen spike, as opposed to separate components within a hollow tubular housing.

In the embodiment shown in FIG. 4A, piercing member 452 is shown in the shape of a four-sided polygonal pyramid, but in other embodiments the piercing member may contain as few as three sides, or more than four sides or may even be configured as a cone. Piercing member 452 has at least two openings at or adjacent to the first tubular housing end, such as, for example, along two of the pyramidal sides. The first opening 454 is configured to permit fluid to exit the multi-lumen spike. The second opening 455 is configured to permit fluid to enter the multi-lumen spike. In certain embodiments, the first opening 454 and the second opening 455 are disposed along opposite sides, e.g., 180 degrees offset, of the tubular housing 451.

Figure 5:
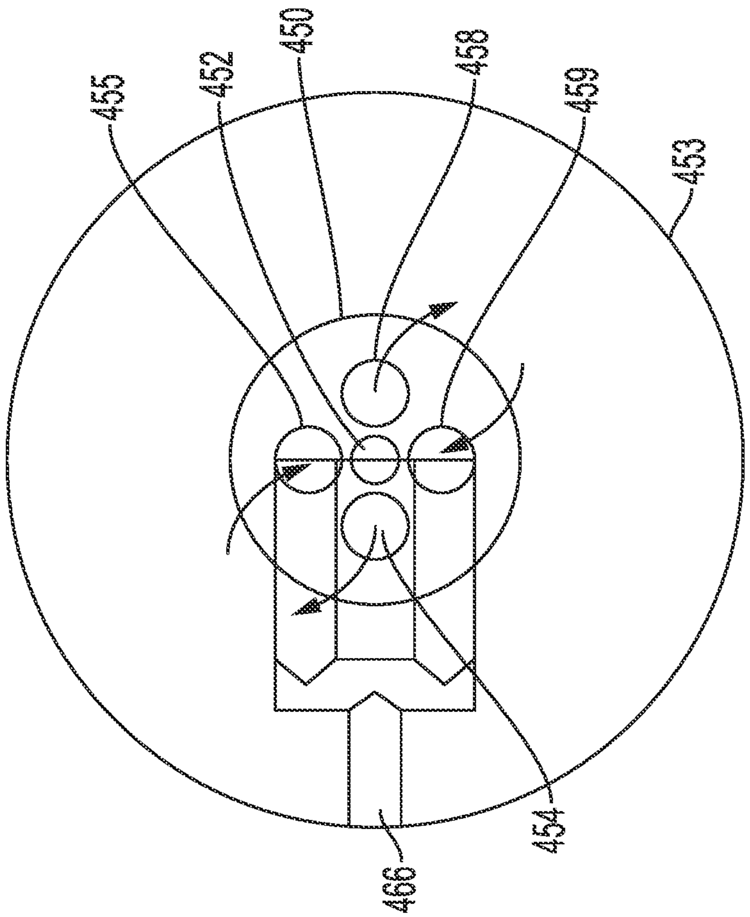
FIG. 5 is a schematic view of the first tubular housing end, the spike of the multi-lumen spike, embodying the present invention.

In embodiments with a four-sided polygonal pyramid, inlet lumen 456 has a branch line which branches from inlet lumen 456 at an inlet lumen branch point located between base member 453 and piercing member 452 such that the inlet lumen branch line extends from the inlet lumen branch point to a third opening 458 at or adjacent to the first tubular housing end, as illustrated in FIG. 5. Outlet lumen 457 has a branch line which branches from outlet lumen 457 at the first outlet lumen branch point located between the base member 453 and piercing member 452 such that the first outlet lumen branch line extends from the first outlet lumen branch point to the fourth opening 459 at or adjacent to the first tubular housing end, as illustrated in FIG. 5.

Turning back to FIG. 4A, base member 453 contains fluid entry port 465 and fluid exit port 466. In the embodiment shown in FIG. 4A, fluid entry port 465 is located on the opposite surface as the surface that abuts tubular housing 451, and fluid exit port 466 is located on the perimeter wall of base member 453. In embodiments, both fluid entry port 465 and fluid exit port 466 can be located on any surface of base member 453.

When the multi-lumen spike is used for the mixing and reconstituting of a powdered medication, fluid (diluent) enters fluid entry port 465, flows through inlet lumen 456 and exits multi-lumen spike 450 at the first opening 454. The fluid exiting the first opening 454 then mixes with the dry medication 460 in medication vial 462 (shown separately in FIG. 4B, but in actual operation the sealed top 430 with a rubber septum would be pierced by piercing member 452 of multi-lumen spike 450 and the two would be in fluid connection, as shown, for example, in FIG. 1C. After mixing with the dry medication 460, the reconstituted medication enters the second opening 455, and travels through outlet lumen 457, exiting multi-lumen spike 450 at fluid exit port 466 located in base member 453.

In an embodiment with four openings, such as illustrated in FIG. 5, fluid would exit multi-lumen spike 450 through first opening 454 and third opening 458, and reconstituted medication would enter multi-lumen spike 450 through second opening 455 and fourth opening 459, with the fluid flows combining such that the reconstituted medication exits base member 453 through a single fluid exit port 466. Openings 454, 455, 458, 459 can have any shape, including, for example, circular or oval. Further, openings 454, 454, 458, 459 can be positioned along the same point along the longitudinal axis of the tubular housing 451 or one or more openings 454, 454, 458, 459 may be offset along the longitudinal axis of the tubular housing 451 from one or more other openings 454, 454, 458, 459. In certain embodiments, first opening 454 and second opening 455 are disposed along opposite sides, e.g., 180 degrees offset, of tubular housing 451 and third opening 458 and fourth opening 459 are disposed along opposite sides, e.g., 180 degrees offset, of tubular housing 451. In certain embodiments, each of openings 454, 454, 458, 459 is offset 90 degrees or about 90 degrees from another one of the openings about the exterior side of tubular housing 451.

Figure 6B:
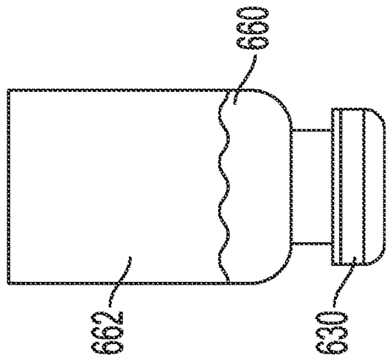
FIG. 6B is a schematic view of the medication vial for use in connection with the multi-lumen spike embodying the present invention in an orientation where the medication being reconstituted is located above the multi-lumen spike.
Figure 6A:
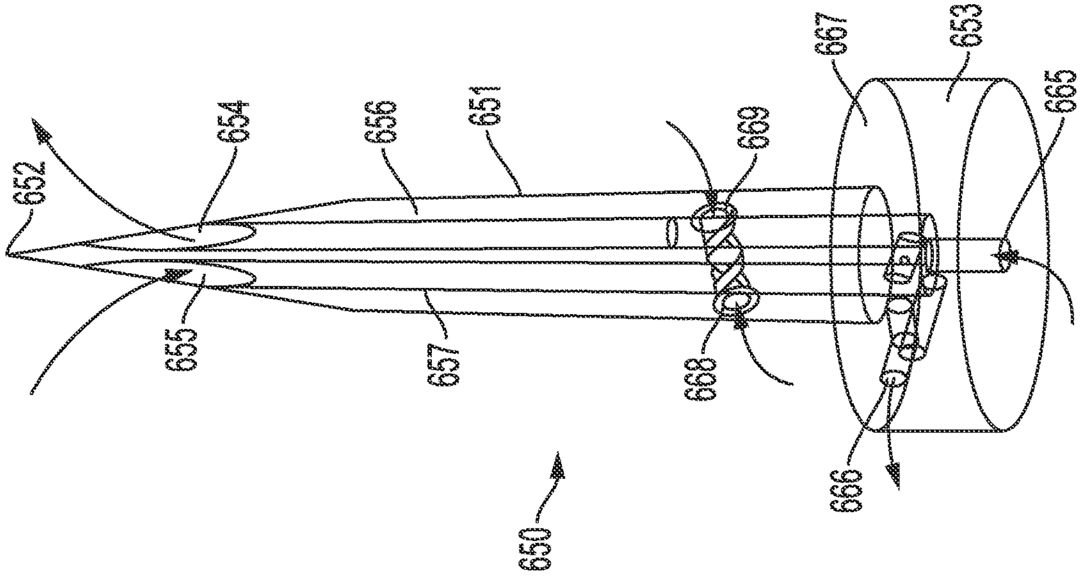
FIG. 6A is a schematic view of another embodiment of the multi-lumen spike embodying the present invention, preferably for use when the medication being reconstituted is located above the multi-lumen spike.

Turning to FIG. 6A, a schematic view of another embodiment of the multi-lumen spike embodying the present invention is shown. This embodiment is preferably for use when the medication being reconstituted is located above the multi-lumen spike. In such a configuration, when the diluent exits the first opening 654, it will naturally fall towards base member 653. Further, as shown in FIG. 6B, when medication vial 662 is oriented such that the medication can be reconstituted when medication vial 662 is above multi-lumen spike 650, with the rubber septum of sealed top 630 pierced by piercing member 652 of multi-lumen spike 650, powdered medication 660 is pulled by gravity towards sealed top 630. Accordingly, to better assist the reconstituted medication in exiting medication vial 662, two additional branch lines branch from outlet lumen 657, terminating at openings on tubular housing 651, namely fluid outlet port 669 and fluid outlet port 668. In certain embodiments, fluid outlet port 669 and fluid outlet port 668 are disposed along opposite sides, e.g., 180 degrees offset, of the tubular housing 451. Thus, the reconstituted medication can exit the medication vial 662 through the second opening 655, as well as fluid outlet ports 668 and 669. Fluid enters the multi-lumen spike through fluid entry port 665 located in base member 653, flows through inlet lumen 656 and exits multi-lumen spike 650 at the first opening 654. In embodiments, instead of branch lines within tubular housing 651, each lumen has its own entry and exit port through base member 653.

Figure 7C:
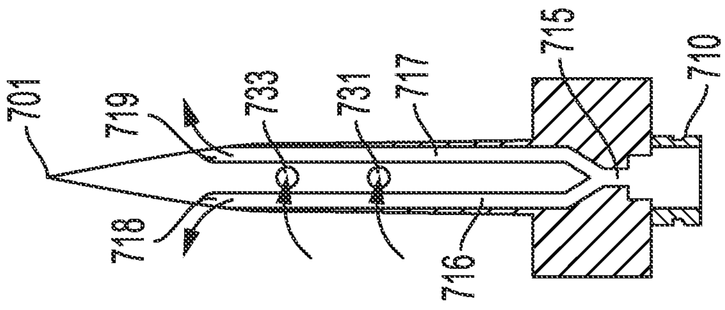
FIG. 7C is a cross-sectional view of the embodiment of FIG. 7B, along the line 7C-7C of FIG. 7B.
Figure 7B:
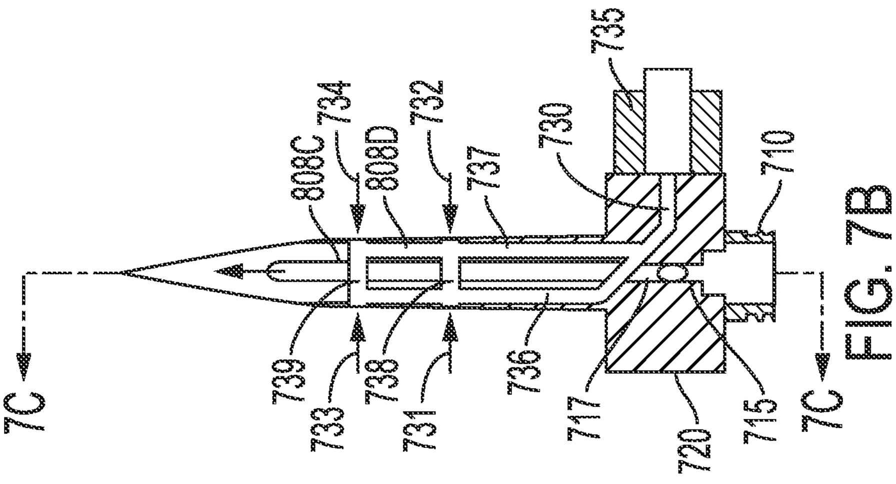
FIG. 7B is a cross-sectional view of the embodiment of FIG. 7A, along the line 7B-7B of FIG. 7A.
Figure 7A:
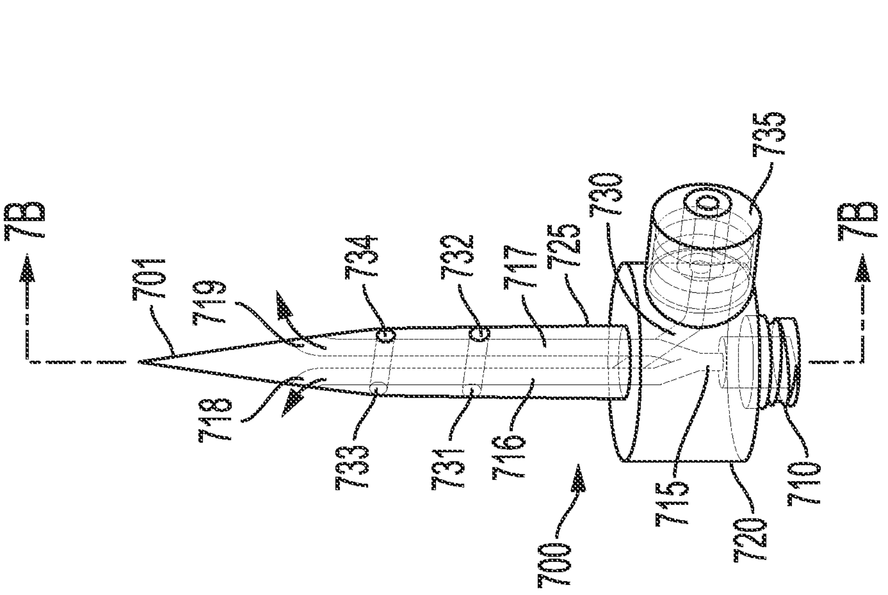
FIG. 7A is a perspective view another embodiment of the multi-lumen spike embodying the present invention.

Turning to FIG. 7A, a perspective view of another embodiment of the multi-lumen spike embodying the present invention is shown. In this embodiment, multi-lumen spike 700 is configured with a female Luer lock connector 710 to engage and be removably coupled to the syringe (not shown) which is typically fabricated with a male Luer lock connector. Inlet lumen 715 is configured to receive the diluent from the syringe. Inlet lumen 715 has two branch lines, inlet lumen branch line 716 and inlet lumen branch line 717, which branch from inlet lumen 715 at a point along base member 720 and/or tubular housing 725. Inlet lumen branch lines 716 and 717 terminate on or adjacent to the exterior surface of piercing member 701 at inlet lumen branch line opening 718 and inlet lumen branch line opening 719. In an embodiment, the exterior surface of the piercing member 701 may have a conical shape. In an embodiment, inlet lumen 715 does not branch out and instead terminates at an inlet lumen outlet on or adjacent to the exterior surface of piercing member 701.

Tubular housing 725 is configured with two or more outlet lumen branch line openings which are the end point of two or more outlet lumen connector lines. The outlet lumen connector lines are connected to two outlet lumen branch lines which themselves merge into one outlet lumen 730. FIG. 7C, described below, illustrates this configuration. Alternatively, tubular housing 725 is configured with one outlet lumen opening and one outlet lumen without any branch lines. In embodiments with outlet lumen branch lines, the number of outlet lumen branch line openings can range from one to eight, and preferably four, as shown in FIG. 7A. Specifically, the multi-lumen spike 700 of FIG. 7A has outlet lumen branch line openings 731, 732, 733 and 734. In an embodiment, the outlet lumen branch line opening 731 and the outlet lumen branch line opening 732 are disposed along opposite sides, e.g., 180 degrees offset, of the tubular housing 725. In an embodiment, the outlet lumen branch line opening 733 and the outlet lumen branch line opening 734 are disposed along opposite sides, e.g., 180 degrees offset, of the tubular housing 725. In an embodiment, the fluidic path between the outlet lumen branch line opening 731 and outlet lumen branch line opening 732 is parallel or substantially parallel to the fluidic path between the outlet lumen branch line opening 733 and the outlet lumen branch line opening 734.

Turning to FIG. 7B, which illustrates a cross-sectional view of FIG. 7A along the lines 7B-7B, outlet lumen 730 branches in at least one location as seen in FIG. 7C, to two branch lines 736 and 737 which connect with outlet lumen connector lines 738 and 739 which terminate at outlet lumen branch line openings 731, 732, 733 and 734. Outlet lumen 730 terminates at a male Luer lock connection 735, located on the perimeter of base member 720 to engage and be removably coupled to tubing which is typically connected to the female Luer lock of the elastomeric pump, which typically terminates with a male Luer lock connection.

Inlet lumen 715, with inlet lumen branch line 717 is visible in the cross-section of FIG. 7C, in connection with and fluidicly coupled to female Luer lock connector 710, which is configured to engage the syringe (not shown).

One of ordinary skill in the art would recognize that there are numerous configurations of the outlet lumen branch lines that would terminate in outlet lumen branch line openings. For example, each outlet lumen branch line opening can have a dedicated outlet lumen branch line.

Turning to FIG. 7C, which illustrates a cross-sectional view of FIG. 7B along the lines 7C-7C, the inlet lumen branch lines 716 and 717 are readily visible branching from inlet lumen 715, and terminating at inlet lumen branch line openings 718 and 719.

Figure 9B:
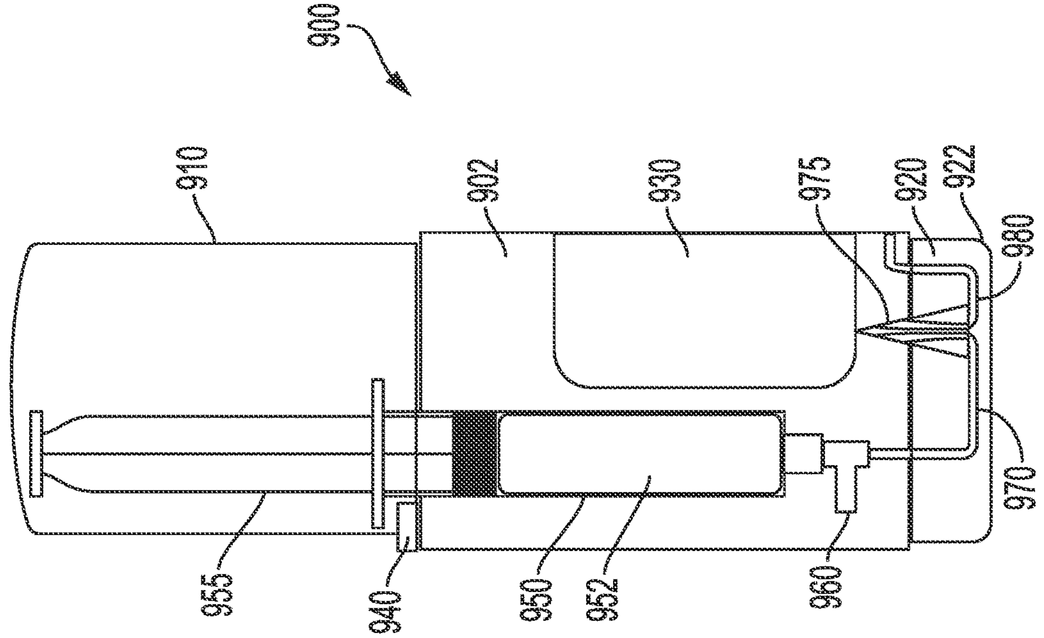
FIG. 9B is an interior view of the embodiment of the mixing and loading apparatus if FIG. 9A embodying the present invention shown in a pre-loaded loaded state.
Figure 9A:
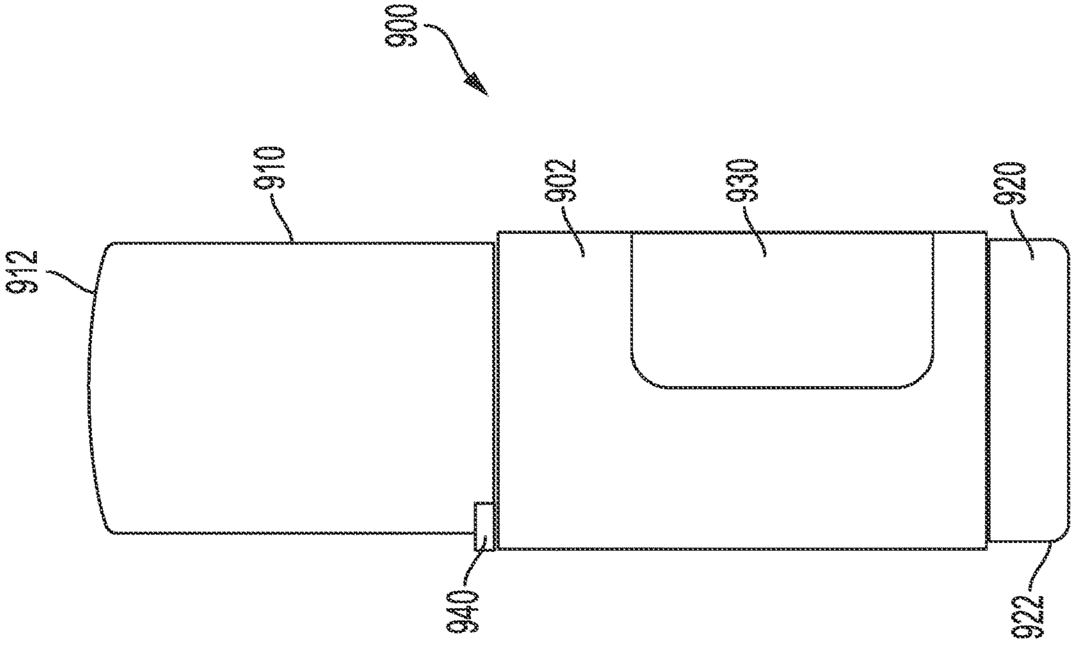
FIG. 9A is a schematic view of another embodiment of the mixing and loading apparatus equipped with the multi-lumen spike of the present invention embodying the present invention shown in a pre-loaded or loaded state.

Turning to FIG. 9A, an embodiment of the mixing and loading apparatus 900, shown in a loaded state and described herein, includes a hollow housing 902 with an open upper end and open lower end. In description of this embodiment and throughout the disclosure the words upper and lower are used as terms of convenience to describe the mixing and loading apparatus shown in the orientation of FIG. 9A but do not specifically relate to gravitational direction. In the embodiment illustrated in FIG. 9A, housing 902 is illustrated in a tubular shape, but the housing could be any other shape that permits the mixing and loading apparatus to function as designed.

Housing 902 has a push button member 910 slidably mounted at the open upper end of housing 902, and retractable floor 920 slidably mounted at the lower end of housing 902. In embodiments, push button member 910 has a hollow construction with a closed upper end 912 and an open lower end, thus creating a push button cavity. Retractable floor 920 has a hollow construction with a closed lower end 922 and an open upper end, thus forming a retractable floor cavity. In embodiments, housing 902 includes an opening in the perimeter wall of housing 902 which forms compartment 930 which can be accessed by opening a panel (not shown) in order to insert a medication vial into compartment 930 of mixing and loading apparatus 900. In embodiments, the panel or other portion of the compartment which comprises the housing is translucent so the patient/end user can view the status of the medication within the vial.

FIG. 9A illustrates the mixing and loading apparatus in either the pre-loaded or loaded state, the only difference being whether the medication vial has been placed within compartment 930. In FIG. 9A, push button 910 is in an open position, and extends beyond the top of the open upper end of housing 902. Push button 910 is preferably designed with a hollow construction with a perimeter the same shape as that of housing 902. In the embodiment shown in FIG. 9A, push button 910 is designed to slide into housing 902. In other embodiments, push button 910 can be designed such that its perimeter is slightly greater than that of housing 902 such that when push button 910 is depressed its outer perimeter extends over housing 902 as the upper end of the push button approaches the upper end of the housing. In a preferred embodiment both housing 902 and push button 910 are constructed as cylindrical shapes with the diameter of push button 910 being slightly less than the diameter of housing 902 to permit push button 910 to slide into housing 902 when depressed.

Retractable floor 920 is extended out of the open lower end of housing 902. Retractable floor 920 is preferably designed with a hollow construction with a perimeter the same shape as that of housing 902. In the embodiment shown in FIG. 9A, retractable floor 920 is designed to slide into housing 902. In other embodiments, retractable floor 920 can be designed such that its perimeter is slightly greater than that of housing 902 such that when retractable floor 920 retracts its outer perimeter extends over housing 902 as the lower end of the retractable floor approaches the lower end of the housing. In a preferred embodiment both housing 902 and retractable floor 920 are constructed as cylindrical shapes with the diameter of retractable floor 920 being slightly less than the diameter of housing 902 to permit retractable floor 920 to slide into housing 902 when it retracts.

In embodiments, safety mechanism 940 prevents push button 910 from being pressed and pushed into housing 902 until the safety mechanism 940 is disengaged. Safety mechanism 940 can include a pin, button, tape, or any other means known to one of ordinary skill in the art. In embodiments, safety mechanism 940 has an interlocking mechanism which also prevents retractable floor 920 from being depressed. In embodiments (not shown), a separate safety mechanism prevents retractable floor 920 from being retracted into housing 902.

FIG. 9B illustrates an interior view of the mixing and loading apparatus embodying the present invention shown in a pre-loaded state. As seen in FIG. 9B, syringe 950 is housed within housing 902. In the embodiment illustrated in FIG. 9B, syringe 950 is either a conventional 20 mL or greater volume syringe (50 mL, 110 mL) syringe with barrel 952 of syringe 950 filled with either 20 mL, 50 mL or 100 mL of 0.9% saline solution. In embodiments, syringe 950 can be of any size sufficient to reconstitute the desired medication. Syringe 950 is loaded into the mixing and loading apparatus with plunger 955 extending above the upper end of housing 902 and into the cavity of push button 910. In this embodiment, multi-lumen spike 975 does not have a base member such as shown in FIG. 4A. Instead, first conduit 970 connects the syringe to the inlet lumen and the outlet lumen is connected to second conduit 980. Second conduit 980 extends out of housing 902 and can be connected to an elastomeric infusion pump, whether prefilled or filled via 50 or 100 mL syringe, or into a larger diluent bag such as 0.9% sodium chloride for gravity infusion. With the exception of having no base member, the design of the multi-lumen spike can be one of the numerous embodiments described herein, including that of FIG. 4A, 6A, 7A, or 8.

Figure 9D:
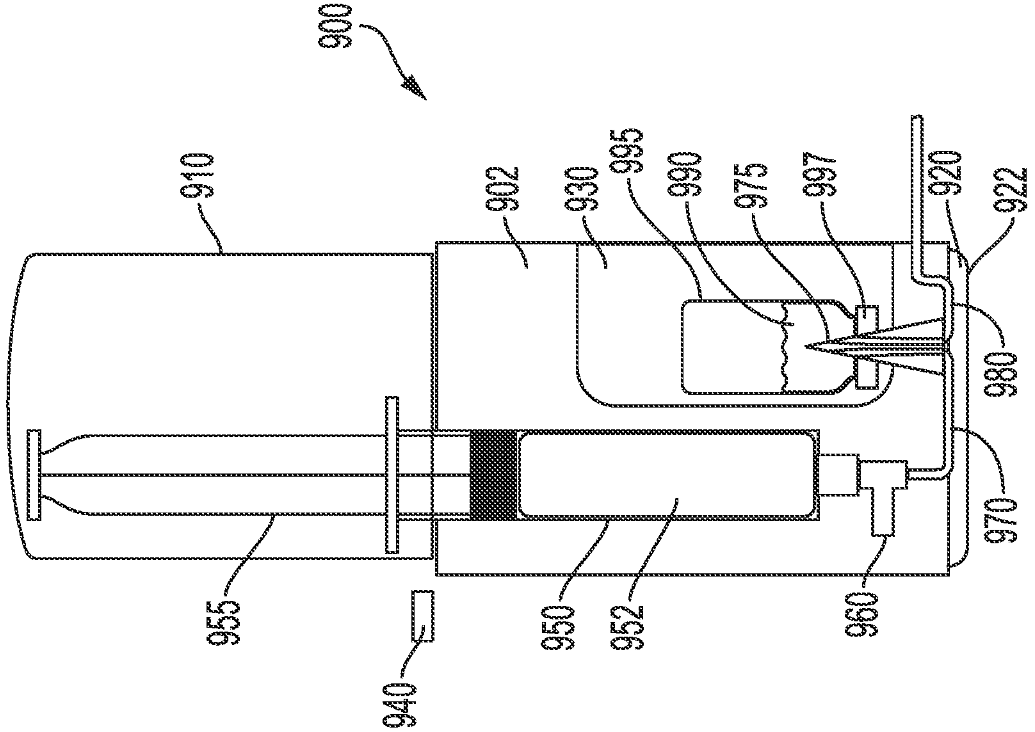
FIG. 9D is an interior view of the embodiment of the mixing and loading apparatus of FIG. 9A embodying the present invention shown in a loaded state after the patient has retracted the retractable floor.
Figure 9C:
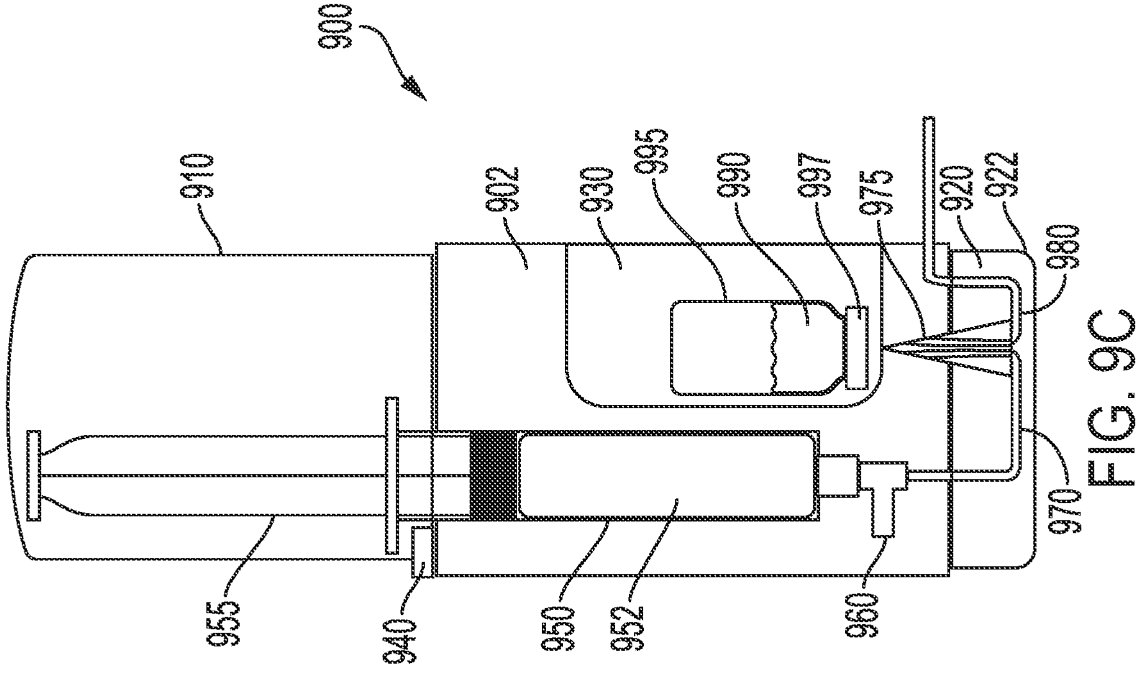
FIG. 9C is an interior view of the embodiment of the mixing and loading apparatus of FIG. 9A embodying the present invention shown in a fully loaded state.

FIG. 9C is an interior view of the mixing and loading apparatus of FIG. 9A shown in a loaded state. As shown in FIG. 9C, vial 995, with medication 990 has been placed in compartment 930 with cap 997 resting on the bottom surface of compartment 930. Cap 997 is a typical vial cap constructed with a pierceable septum to permit access to the contents of vial 995. The septum is most commonly manufactured and constructed of a rubber pierceable material. Medication 990 can be sterile lyophilized powder for injection. Medication 990 can also be a sterile aqueous liquid solution for injection which requires dilution prior to being delivered intravenously to a patient.

In embodiments, vial 995 is a standard FDA approved commercially available injection medication vial with a typical 20 mm closure diameter. In embodiments, compartment 930 is sized to prevent significant lateral movement of vial 995. In embodiments, compartment 930 is sized to accommodate multiple commercially available vial sizes and has grooves with flanges in or near the bottom surface of compartment 930 into which cap 997 of vial 995 slidably engages, to keep vial 995 in contact with the bottom surface of compartment 930. Vial 995 can either be attached and loaded within compartment 930 in the preferred embodiment under sterile conditions according to USP<797> guidelines or by an end-user/patient at home preparing to reconstitute medication 990 immediately prior to use.

FIG. 9D illustrates the first step in the reconstitution process of medication 990 and transitioning the mixing and loading apparatus from a loaded state to an unloaded state. As seen in FIG. 9D, the safety mechanism 940 has been removed, permitting movement of retractable floor 920 and push button 910. In FIG. 9D, the patient has pushed retractable floor 920 against a surface, causing retractable floor 920 to retract into housing 902, as seen in FIG. 9D. This causes multi-lumen spike 975, located along or on the inner surface 922 of retractable floor 920, to travel upwards towards vial 990, causing multi-lumen spike 975 to pierce the septum of cap 997 of vial 995.

Figure 9F:
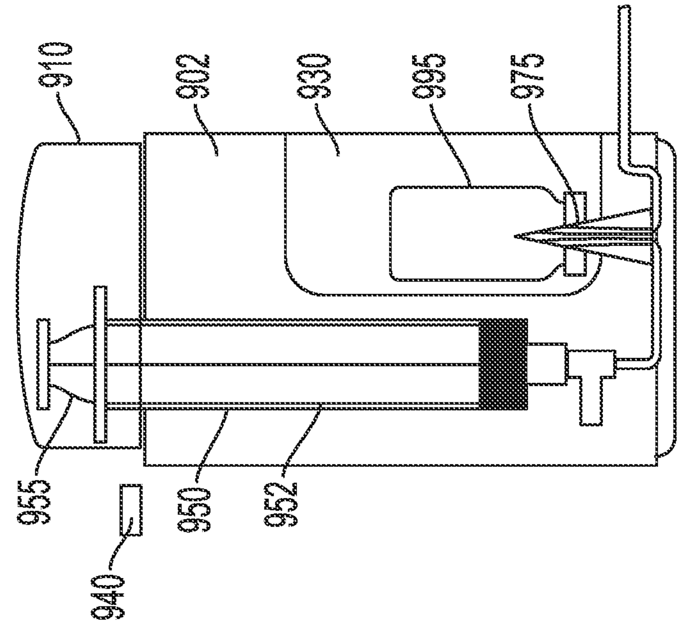
FIG. 9F is an interior view of the embodiment of the mixing and loading apparatus of FIG. 9A embodying the present invention in the fully unloaded position shown after the patient begins to depresses the push button member, injecting diluent into the medication vial.
Figure 9E:
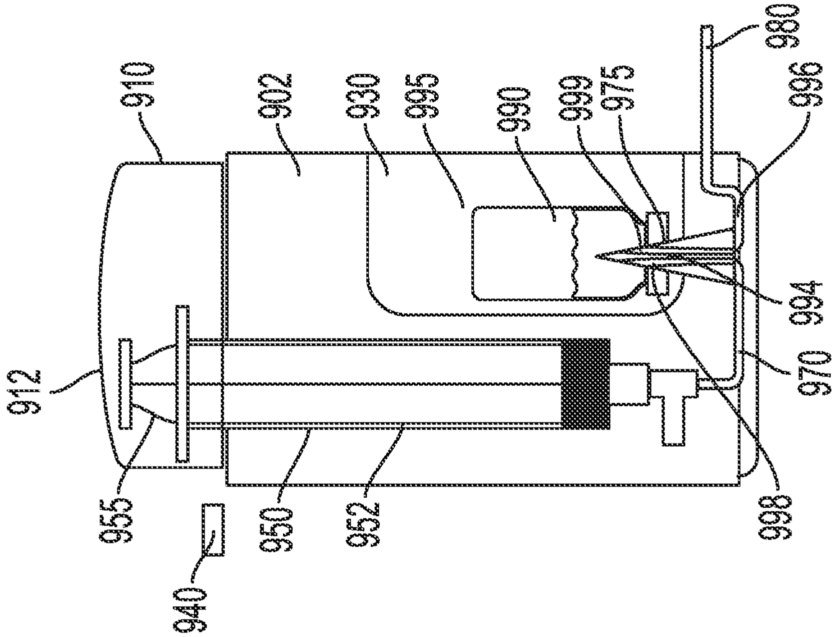
FIG. 9E is an interior view of the embodiment of the mixing and loading apparatus of FIG. 9A embodying the present invention shown after the patient begins to depresses the push button member, injecting diluent into the medication vial.

FIG. 9E illustrates the mixing and loading apparatus embodying the present invention with multi-lumen spike of the type described with respect to FIGS. 9A-9C shown after the patient begins to press push button 910 into housing 902 to initiate the reconstitution of medication 990. As the patient pushes down on push button 910, upper end 912 of push button 910 comes into contact with the upper end of plunger 955 of syringe 950. As plunger 950 enters housing 902, the normal saline solution of barrel 952 of syringe 950 is discharged into first conduit 970, through the inlet lumen 994, and out the inlet lumen opening 998 into vial 995 to commence the reconstitution of medication 990. Multi-lumen spike 975 creates a unique mixing flow to fully reconstitute medication 990. The reconstituted medication then enters through at least one outlet lumen opening 999, entering the outlet lumen 996, and then second conduit 980. The reconstituted medication in second conduit 980 can then be collected in any means, including through the use of an elastomeric infusion pump.

Though the multi-lumen spike illustrated in FIGS. 9A-9F is shown with only one inlet lumen and one outlet lumen, one of ordinary skill in the art would appreciate that the design of the multi-lumen spike can be one of the numerous embodiments described herein, including that of FIG. 4A, 6A, 7A, or 8, and may comprise more than one inlet lumen such as the two inlet lumens of FIGS. 7A-7C, and more than one outlet lumen, such as the four outlet lumens of FIGS. 7A-7C.

FIG. 9F illustrates the mixing and loading apparatus embodying the present invention in the fully unloaded position. In the fully unloaded position, push button 910 has been fully depressed, causing plunger 955 to fully travel through barrel 952 of syringe 950 to dispense the diluent contained within syringe 950. As seen in FIG. 9F, push button 910 will cease its downward lateral movement when plunger 955 prevents the downward motion of push button 910. Depending on the plunger size, push button 910 may not be depressed fully into housing 902. In the fully unloaded state, the medication has been fully reconstituted and there is no longer any medication 990 within vial 995. The patient can confirm full reconstitution of the medication by viewing the status of the reconstitution through a window into compartment 930.

Figure 10A:
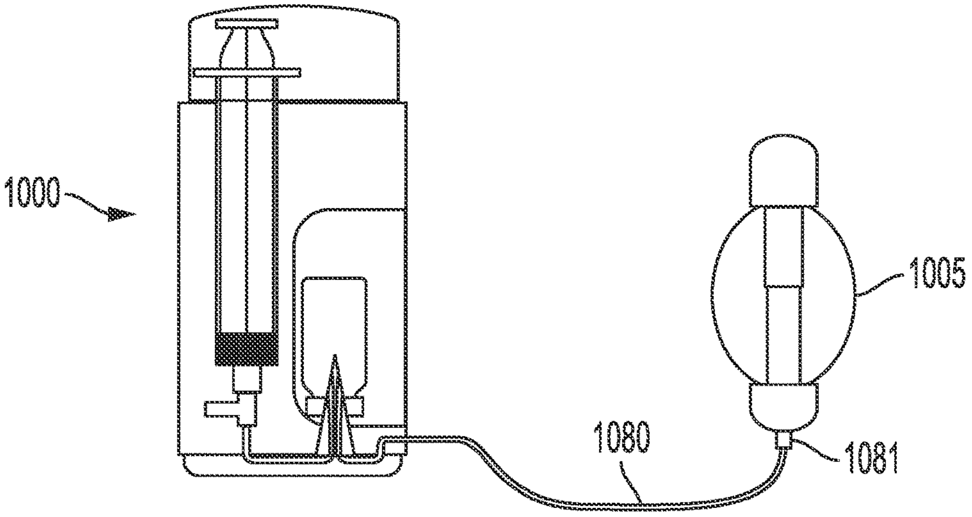
FIG. 10A is an interior view of the embodiment of the mixing and loading apparatus of FIG. 10A embodying the present invention attached to an elastomeric infusion pump, shown in after the patient depresses the compressible roof, injecting diluent into the medication vial.
Figure 10B:
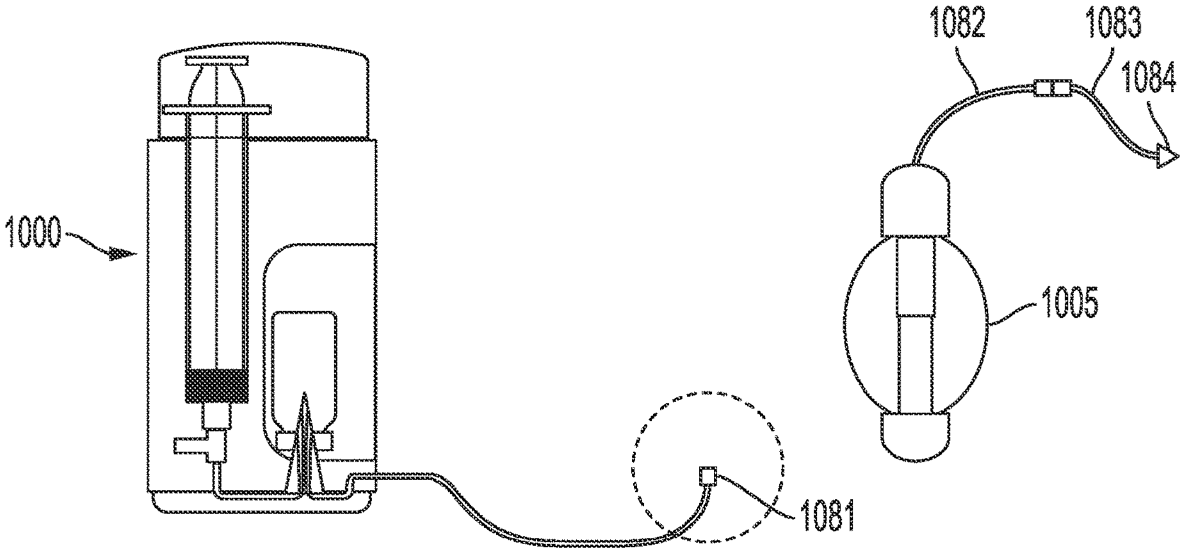
FIG. 10B is an interior view of the embodiment of the mixing and loading apparatus of FIG. 10A with an elastomeric infusion pump, shown after the patient detaches the mixing and loading apparatus from the elastomeric infusion pump.

FIGS. 10A and 10B illustrate an embodiment where the mixing and loading apparatus is used in connection with an elastomeric infusion pump. Referring to FIG. 10A, the mixing and loading apparatus 1000 is shown in an unloaded state. In this state, the reconstituted medication flows from the mixing and loading apparatus through the second conduit 1080 and into elastomeric infusion pump 1005 through 1081 Luer lock extension tubing. In the embodiment illustrated in FIGS. 10A and 10B, elastomeric infusion pump is received by the patient prefilled with either 50 mL, 100 mL or greater saline solution even up to 1,000 mL, depending on the size of the elastomeric pump. After the reconstituted solution flows to the prefilled elastomeric infusion pump, elastomeric infusion pump 1005 is detached from the second conduit 1080 at 1081, as seen in FIG. 10B.

As seen in FIG. 10B, elastomeric infusion pump 1005 is then connected via standard elastomeric pump tubing to the patient's vascular access device. Examples of such a vascular access device are the short-term use PIV (Peripheral Intravenous Line) to the more long-term and more standard Midlines, PICC (Peripherally Inserted Central Catheter) lines, and Port-A-Caths.

In an alternate embodiment, the elastomeric pump can be included within the housing, similar to the embodiment disclosed in FIGS. 1A-1C, but with the multi-lumen spike configuration disclosed in FIGS. 9A-9D.

The mixing and loading apparatus is preferably made out of molded plastic. However, a great variety of materials may be used in constructing the mixing and loading apparatus of this invention. Such material selection would be obvious to those skilled in the art.

Test Methods

Mixing Efficiency Testing

Potency studies were conducted to confirm that the multi-lumen spike of the mixing and loading apparatus reconstitutes a powdered medication with equal or greater efficiency as the conventional reconstitution which includes the manual step of vial agitation, typically by the home infusion pharmacist.

For this investigation, potency studies were conducted using the multi-lumen spike in combination with three commercially available elastomeric infusion pumps in addition to a control, which consists of reconstituting a powdered medication with the manual step of vial agitation.

Potency is defined as a measure of the concentration, strength or activity of a medication. Potency is usually expressed as the amount of active pharmaceutical ingredient ("API") within some unit measure of the medication, such as, but not limited to mg/mL, mg/gm, IU/mL, mg/capsule, mg/pellet etc., where the numerator is the amount API, and the denominator is the unit measure of the medication. Specifications for potency are typically expressed as a range, such as, but not limited to 90.0-110.0% of label value. Four potency studies were performed. Three tests were conducted in non-USP <797> environments, specifically an office setting outside of a cleanroom, in regular air-conditioned ambient room temperature air. A fourth test, serving as a control, was performed utilizing the same drug, diluent and final containers as in the three non-control studies but with the sterile aseptic compounding performed in a fully compliant USP <797> cleanroom complex.

For each of the four studies, one gram of powdered Cefazolin sodium was reconstituted.

Test 1: Cefazolin 1 Gram, 100 mL BBraun Easypump

For the first test, a 1 gram vial of Cefazolin sodium for injection powder (National Drug Code [NDC]#00143-9924-90) was reconstituted by using 100 mL of saline solution. The 100 mL saline solution syringe was connected via a female Luer lock to the multi-lumen spike illustrated in FIGS. 7A-7C. A BBraun 100 mL Easypump elastomeric pump was connected to the multi-lumen spike illustrated in FIGS. 7A-7C via a male Luer lock. The multi-lumen spike was then inserted into the Cefazolin vial. The two angled inlet channels of the multi-lumen spike directed diluent into the Cefazolin vial and the 4 outlet channels of the multi-lumen spike took the reconstituted medication into the BBraun 100 mL Easypump. Upon depressing the syringe plunger, the 100 mL of saline solution simultaneously reconstituted and diluted the 1 gram Cefazolin vial while concurrently also filling and inflating the 100 mL capacity, 100 mL per hour BBraun Easypump. The potency results are presented below in Table 1.

Test 2: Cefazolin 1 Gram, 100 mL Epic SmartEZ

For the second test, a 1 gram vial of Cefazolin sodium for injection powder (National Drug Code [NDC]#00143-9924-90) was reconstituted by using 100 mL of saline solution. The 100 mL saline solution syringe was connected via a female Luer lock to the multi-lumen spike illustrated in FIGS. 7A-7C. An Epic Medical 100 mL SmartEZ elastomeric pump was connected to the multi-lumen spike illustrated in FIGS. 7A-7C via a male Luer lock. The multi-lumen spike was then inserted into the Cefazolin vial. The two angled inlet channels of the multi-lumen spike directed diluent into the Cefazolin vial and the 4 outlet channels of the multi-lumen spike took the reconstituted medication into the SmartEZ elastomeric pump. Upon depressing the syringe plunger, the 100 mL of saline solution simultaneously reconstituted and diluted the 1 gram Cefazolin vial while concurrently also filling and inflating the 100 mL capacity, 100 mL per hour SmartEZ elastomeric pump. The potency results are presented below in Table 1.

Test 3: Cefazolin 1 Gram, 100 mL Intravia IV Bag

For the third test, a 1 gram vial of Cefazolin sodium for injection powder (National Drug Code [NDC]#00143-9924-90) was reconstituted by using 100 mL of saline solution. The 100 mL saline solution syringe was connected via a female Luer lock to the multi-lumen spike illustrated in FIGS. 7A-7C. A Baxter Intravia 150 ml capacity IV bag was connected to the multi-lumen spike illustrated in FIGS. 7A-7C via a male Luer lock. The multi-lumen spike was then inserted into the Cefazolin vial. The two angled inlet channels of the multi-lumen spike directed diluent into the Cefazolin vial and the 4 outlet channels of the multi-lumen spike took the reconstituted medication into the Intravia IV bag. Upon depressing the syringe plunger, the 100 mL of saline solution simultaneously reconstituted and diluted the 1 gram Cefazolin vial while concurrently also filling and inflating the 150 mL capacity, Intravia IV bag. The potency results are presented below in Table 1.

Control: Cefazolin 1 Gram, 100 mL BBraun Easypump

For the control test, a 1 gram vial of Cefazolin sodium for injection powder (National Drug Code [NDC]#00143-9924-90) was manually reconstituted. First, 10 mL of saline solution was injected into a vial containing one gram of Cefazolin. The needle was removed from the vial and the vial was manually agitated by shaking to reconstitute the Cefazolin. A syringe was then inserted into the vial and the 10 mL of reconstituted Cefazolin was withdrawn from the vial. The needle affixed to the end of the syringe was then removed so that the male Luer lock was exposed, allowing it to be affixed to the entry port of a BBraun 100 mL Easypump elastomeric pump. The 10 mL contents were then injected into the Easypump elastomeric pump. The syringe was then removed from the male Luer lock connection and a second syringe filled with 90 mL of saline solution was affixed to the male Luer lock connection and the contents of the syringe were injected into the BBraun 100 mL Easypump elastomeric pump. The potency results for this manual reconstitution are presented below in Table 1.

Test Results

The potency results for the three tests plus the control are presented below in Table 1:

| Potency Test | Test Specification | Test Result |
|---|---|---|
| Test 1 | 90.0-115.0% | 108.4% (10.8 mg/mL) |
| Test 2 | 90.0-115.0% | 104.1% (10.4 mg/mL) |
| Test 3 | 90.0-115.0% | 111.6% (11.2 mg/mL) |
| Control | 90.0-115.0% | 97.0% (9.7 mg/mL) |

As seen above, the Potency results of Tests 1-3 resulted in higher potency percentages than the control, while also within the USP monograph specifically for Cefazolin of 90-115% (USP <797>). What this means is that the multi-lumen spike of the present invention succeeded in thoroughly reconstituting a powdered medication without the need for any manual agitation to a degree that exceeded the efficiency of mixing via manual agitation. Furthermore, while using the multi-lumen spike of the present invention, the powdered medication was successfully reconstituted with saline solution in each of Tests 1-3 and the attached elastomeric pump was simultaneously filled and inflated within 18 seconds.

The 3 studies and control study were compounded six days in advance of the Potency analysis. Since the Potency results of the 3 studies achieved such results six days after compounding, it is clear to those of ordinary skill in the art the patient/end-user will achieve a commensurate or greater Potency again outside of a USP <797> cleanroom environment, when the compounded mixture is to be infused immediately after reconstitution even without access to electricity or refrigeration.

Now that embodiments of the present invention have been shown and described in detail, various modifications and improvements thereon will become readily apparent to those skilled in the art. Accordingly, the exemplary embodiments of the invention, as set forth above, are intended to be illustrative, not limiting. The spirit and scope of the present invention is to be construed broadly.

The invention claimed is:

1. A multi-lumen spike comprising:

a tubular housing comprising:

- a first tubular housing end comprising a conical piercing member configured to pierce a medication vial, the conical piercing member including an exterior face comprising a first opening;
- a second tubular housing end; and
- a tubular housing perimeter wall comprising a second opening;

a base member comprising:

- a first base member end;
- a second base member end coupled to the second tubular housing end; and
- a base member perimeter wall,
- wherein the base member comprises a liquid entry port and a liquid exit port;

an inlet lumen extending from the liquid entry port to the first opening and configured to carry liquid into the tubular housing; and;

an outlet lumen extending from the second opening to the liquid exit port and configured to carry at least the liquid out of the tubular housing, wherein the exterior face of the conical piercing member further comprises a third opening:

the tubular housing further comprises a fourth opening, a fifth opening, and a sixth opening:

the inlet lumen extends within the tubular housing and comprises a first inlet lumen branch line and a second inlet lumen branch line which branch from the inlet lumen at an inlet lumen branch point located between the first base member end and the conical piercing member such that the first inlet lumen branch line extends from the inlet lumen branch point to the first opening and the second inlet lumen branch line extends from the inlet lumen branch point to the third opening;

the outlet lumen extends within the tubular housing and comprises a first outlet lumen branch line and a second outlet lumen branch line which branch from the outlet lumen at an outlet lumen branch point located between the first base member end and the piercing member:

one or more outlet lumen connector lines connect the first outlet lumen branch line and the second outlet lumen branch line to the second opening, fourth opening, fifth opening, and sixth opening.

* * * * *